(12) United States Patent
Tamura et al.

(10) Patent No.: US 10,884,733 B2
(45) Date of Patent: Jan. 5, 2021

(54) INFORMATION PROCESSING APPARATUS, AND INFORMATION PROCESSING METHOD

(71) Applicant: FUJITSU LIMITED, Kawasaki (JP)

(72) Inventors: Yuto Tamura, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 16/029,284

(22) Filed: Jul. 6, 2018

(65) Prior Publication Data

US 2019/0018674 A1 Jan. 17, 2019

(30) Foreign Application Priority Data

Jul. 12, 2017 (JP) .................. 2017-136514

(51) Int. Cl.
*G06F 9/30* (2018.01)
*G06F 9/48* (2006.01)

(52) U.S. Cl.
CPC ........ *G06F 9/3001* (2013.01); *G06F 9/30043* (2013.01); *G06F 9/4881* (2013.01)

(58) Field of Classification Search
CPC .. G06F 9/4881; G06F 9/3001; G06F 9/30043; Y02D 10/00
See application file for complete search history.

(56) References Cited

U.S. PATENT DOCUMENTS

| | | | | |
|---|---|---|---|---|
| 2007/0300227 A1* | 12/2007 | Mall | ...................... | G06F 9/3851 718/102 |
| 2009/0245792 A1* | 10/2009 | Oishi | ................. | H04Q 11/0067 398/66 |
| 2010/0223411 A1 | 9/2010 | Yamaguchi | | |
| 2013/0073812 A1* | 3/2013 | Kanai | ................. | G06F 12/0804 711/141 |
| 2014/0304474 A1* | 10/2014 | Reinhardt | ........... | G06F 12/0875 711/123 |
| 2015/0293785 A1* | 10/2015 | Murphy | ................ | G06F 9/5027 718/102 |
| 2016/0055082 A1* | 2/2016 | Kim | ...................... | G06F 12/023 711/118 |

FOREIGN PATENT DOCUMENTS

| | | |
|---|---|---|
| JP | 7-49822 | 2/1995 |
| JP | 2001-216170 | 8/2001 |
| WO | 2009/060530 | 5/2009 |

* cited by examiner

*Primary Examiner* — Farley Abad
(74) *Attorney, Agent, or Firm* — Fujitsu Patent Center

(57) ABSTRACT

An apparatus causes a management unit included in an arithmetic processing unit to manage, where an executable task is included in a queue, execution of the task. The apparatus causes a standby unit included in the arithmetic processing unit to execute, when the executable task is not included in the queue, a decision process for deciding, by polling, whether information from another apparatus different from the apparatus is received by a communication controller until the executable task is included in the queue.

13 Claims, 20 Drawing Sheets

INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2017-136514, filed on Jul. 12, 2017, the entire contents of which are incorporated herein by reference.

FIELD

The embodiments discussed herein are related to an information processing apparatus, and an information processing method.

BACKGROUND

An information processing apparatus that processes data received from a communication processing apparatus performs, for example, polling of a flag set by the communication processing apparatus to detect that data to be processed is retained by the communication processing apparatus. The information processing apparatus that detects retention of data from the flag communicates with the communication processing apparatus to receive the data and processes the received data. A technique has been proposed in which, in the case where the load of data processing by the information processing apparatus increases, the interval to poll the flag is elongated to suppress execution of data processing from being obstructed by transmission and reception of data (for example, refer to Japanese Laid-open Patent Publication No. 07-49822).

A technique has been proposed in which, in an operating system, after a process based on an interrupt request from a device is completed, acceptance of an interrupt request is suppressed within a given period of time and occurrence of interrupt is detected by polling of a register in the device (for example, refer to Japanese Laid-open Patent Publication No. 2001-216170). A method has been proposed in which, by performing switching between a mode in which data is processed based on an interrupt notification and another mode in which data is processed based on polling in response to the load to a central processing unit (CPU), occupation of the CPU by a process based on the interrupt notification is suppressed (for example, refer to International Publication Pamphlet No. WO 2009/060530).

SUMMARY

According to an aspect of the embodiments, an information processing apparatus includes an arithmetic processing unit configured to execute a task retained in a queue, and a communication controller configured to control communication with another apparatus different than the information processing apparatus. The arithmetic processing unit including a management unit including a first processor configured to manage, when an executable task is included in the queue, execution of the task, and a standby unit including a second processor configured to execute, when the executable task is not included in the queue, a decision process for deciding, by polling, whether information from the another apparatus is received by the communication controller until the executable task is included in the queue.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since a detection process of occurrence of an event by polling is executed by software and a context switch for switching the state of the CPU does not occur, the detection process may be executed at a high speed in comparison with that in a detection process of occurrence of an event by an interrupt request in which a context switch occurs. On the other hand, since the CPU may not execute any other process within a period within which polling of a flag or the like is executed repetitively, there is the possibility that stagnation of execution of the other processes may occur.

According to one aspect, the present disclosure suppresses, in the case where reception of information from a different apparatus is decided by polling, stagnation of execution of a task.

In the following, embodiments are described with reference to the drawings.

Figure 1:
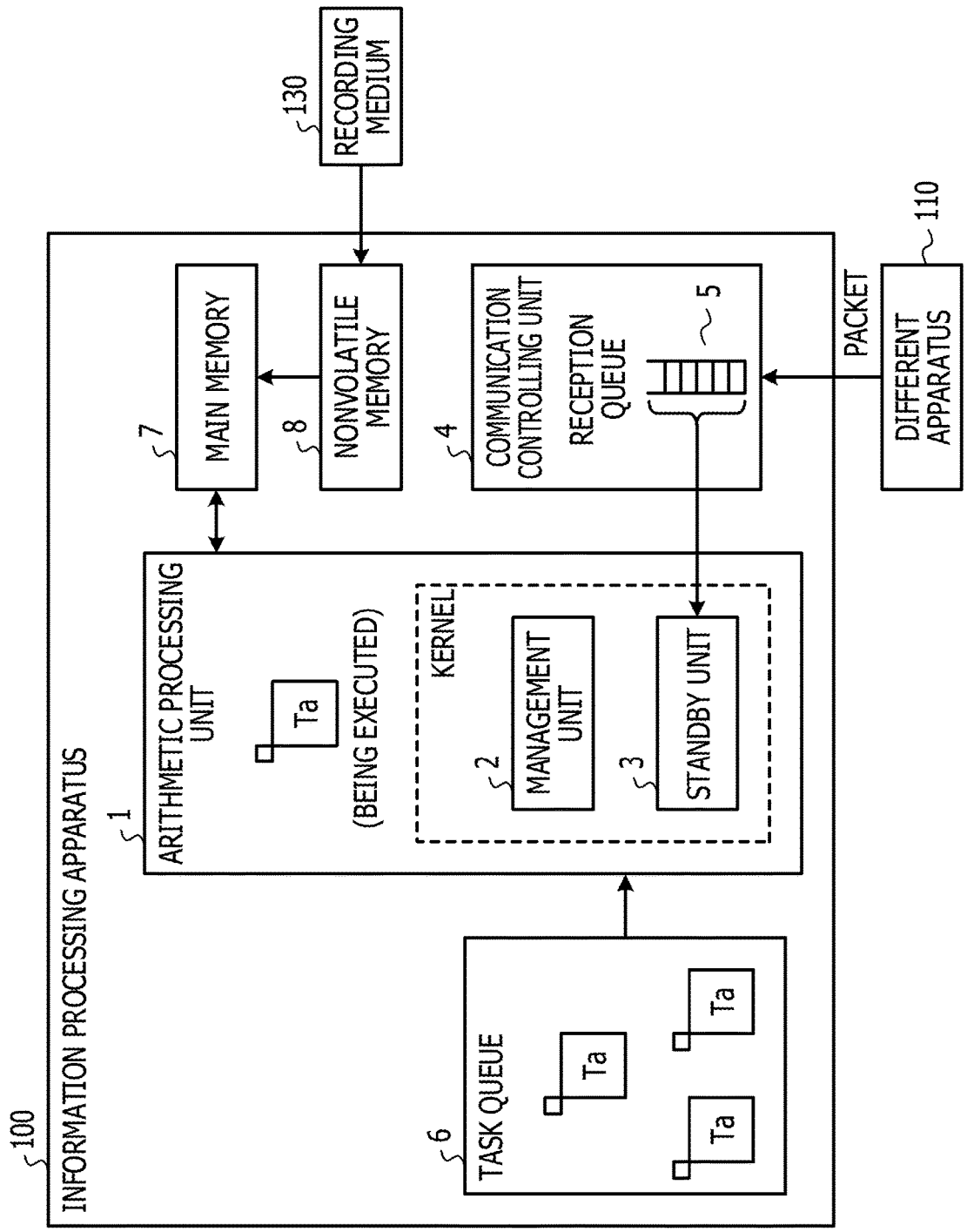
FIG. 1 is a view depicting an embodiment of an information processing apparatus, an information processing method and a program.

FIG. 1 depicts an embodiment of an information processing apparatus, an information processing method and a program. The information processing apparatus 100 depicted in FIG. 1 is, for example, a server and includes an arithmetic processing unit 1, a communication controlling unit 4, a task queue 6, a main memory 7 and a rewritable nonvolatile memory 8. The arithmetic processing unit 1 is a processor such as a CPU or a processor core such as a CPU core and executes tasks T (Ta, Tb, Tc and so forth) retained in the task queue 6. In FIG. 1, the arithmetic processing unit 1 is executing the task Ta retained in the task queue 6. The arithmetic processing unit 1 includes a management unit 2 and a standby unit 3. For example, functions of the management unit 2 and the standby unit 3 are implemented by a kernel executed by the arithmetic processing unit 1. The kernel is a program that is included in an operating system and provides basic functions such as management of resources of the system, interfacing between application software and hardware and so forth.

The communication controlling unit 4 controls communication with a different apparatus 110 coupled to the information processing apparatus 100. The communication controlling unit 4 includes a reception queue 5 including a plurality of storage regions that successively retain packets received from the different apparatus 110. A packet is an example of information that is received from the different apparatus 110 and includes a message and so forth. It is to be noted that the different apparatus 110 may transmit information to the information processing apparatus 100 using a technique other than packet transfer, and the communication controlling unit 4 may retain information received from the different apparatus 110 into the reception queue 5. Further, the communication controlling unit 4 may control communication with a different apparatus provided in the information processing apparatus 100 (an accelerator that assists operation of the arithmetic processing unit 1 and so forth).

In the case where a task T that is executable is included in the task queue 6, the management unit 2 manages execution of the task T. In the case where a task T that is executable by the arithmetic processing unit 1 is not included in the task queue 6, the standby unit 3 executes a decision process for deciding, by polling, whether a packet from the different apparatus 110 is received by the communication controlling unit 4 until after an executable task T is found. For example, the standby unit 3 decides by polling whether or not a packet from the different apparatus 110 is received by the communication controlling unit 4.

The main memory 7 retains data to be used in a task T executed by the arithmetic processing unit 1, various programs to be executed by the arithmetic processing unit 1 and so forth. The various programs include application programs, an operating system including a kernel and so forth. For example, the operating system is first transferred from a recording medium 130 or the like to the nonvolatile memory 8 through an input/output interface not depicted and is then transferred, upon activation of the information processing apparatus 100, from the nonvolatile memory 8 to the main memory 7 and executed by the arithmetic processing unit 1. The recording medium 130 may be a compact disc (CD: registered trademark), a digital versatile disc (DVD: registered trademark), a universal serial bus (USB) memory or the like. It is to be noted that an application program is stored in a hard disk apparatus not depicted or the like and is transferred from the hard disk apparatus or the like to the main memory 7 in accordance with an instruction for activation of the application program, whereafter it is executed by the arithmetic processing unit 1.

Figure 2:
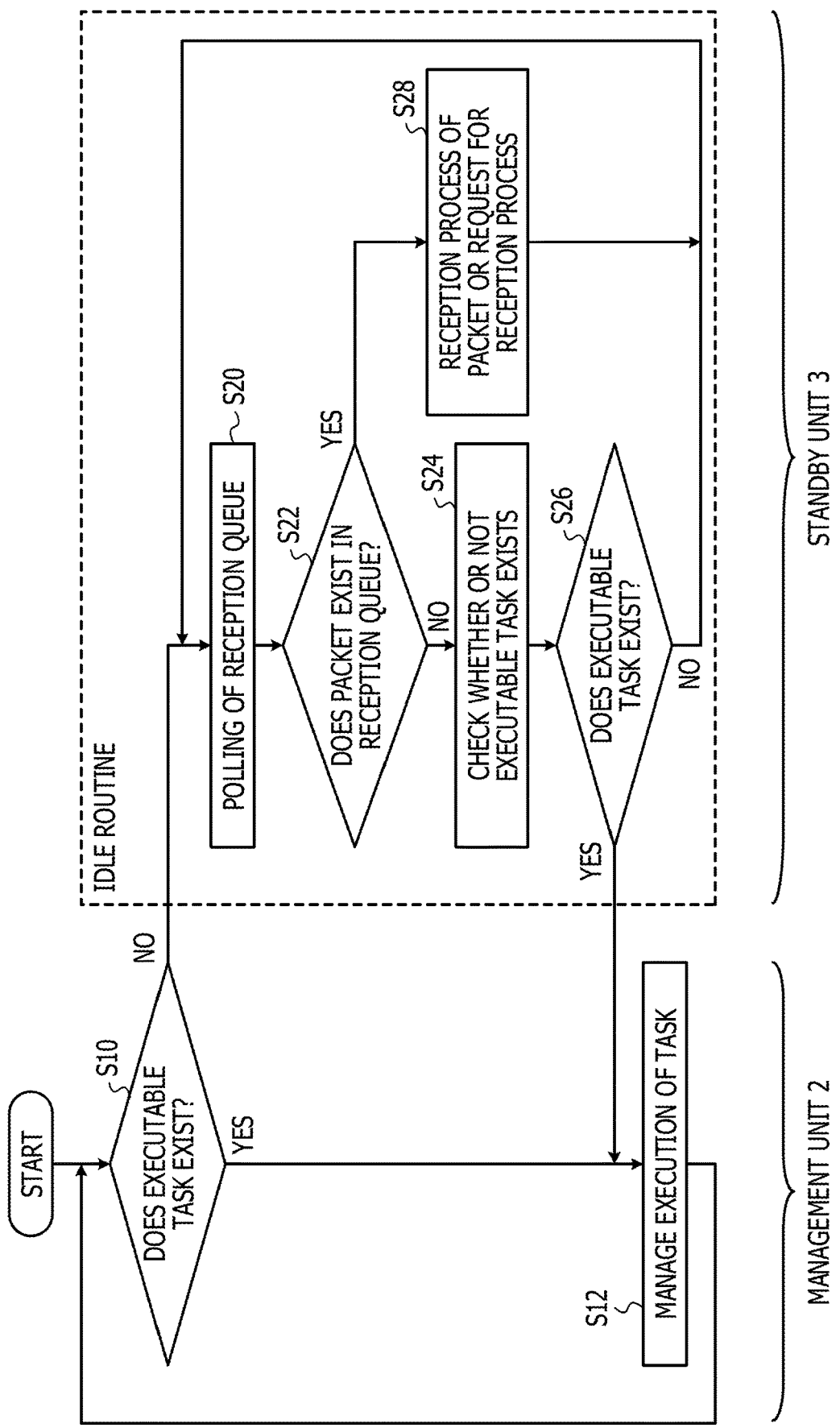
FIG. 2 is a view depicting an example of operation of a kernel executed by an arithmetic processing unit depicted in FIG. 1.

FIG. 2 depicts an example of operation of the kernel executed by the arithmetic processing unit 1 depicted in FIG. 1. For example, FIG. 2 depicts an example of an information processing method executed by the information processing apparatus 100 and a program executed by the arithmetic processing unit 1 of the information processing apparatus 100.

First at step S10, the kernel advances its processing to step S12 in the case where an executable task T exists in the task queue 6. However, in the case where an executable task T does not exist in the task queue 6, the kernel advances the processing to step S20. At step S12, the kernel manages execution of the task T and then returns the processing to step S10. For example, the task T being executed by the arithmetic processing unit 1 is retained in the task queue 6 until after the execution is completed.

The processes at steps S10 and S12 are executed by the management unit 2. The management unit 2 is included in a main body portion of the kernel and includes functions of a scheduler and a dispatcher. The scheduler determines a task T to be executed from among tasks T retained in the task queue 6. The dispatcher interrupts execution of a task T being executed based on determination of the scheduler and causes the arithmetic processing unit 1 to start execution of a task T determined by the scheduler.

At step S20, the kernel polls the reception queue 5 of the communication controlling unit 4. Then at step S22, the kernel advances the processing to step S28 in the case where a packet exists in the reception queue 5, for example, in the case where occurrence of an event is detected. On the other hand, in the case where no packet exists in the reception queue 5, for example, in the case where occurrence of an event is not detected, the kernel advances the processing to step S24.

At step S24, the kernel refers, for example, to the task queue 6 or a flag indicative of a state of the task queue 6 to check whether or not there exists an executable task T. Then at step S26, the kernel advances the processing to step S12 in the case where an executable task T exists in the task queue 6, but advances the processing to step S20 in the case where an executable task T does not exist in the task queue 6. The processes at steps S20 to S26 are an example of a decision process for deciding by polling whether a packet from the different apparatus 110 is received by the communication controlling unit 4 until an executable task T appears.

On the other hand, at step S28, the kernel executes a reception process of a packet and advances the processing to step S20. It is to be noted that, at step S28, the kernel may request a reception process of a packet to the main body portion of the kernel. In the case where a reception process of a packet is requested to the main body portion of the kernel, since a task T for executing a reception process of a packet is stored into the task queue 6, the processing is advanced to step S12 at succeeding step S26.

The processes at steps S20 to S28 are executed by the standby unit 3. The standby unit 3 executes a process (idle routine) different from processes that are executed by the main body portion of the kernel. In the case where an executable task T does not exist in the task queue 6, the processes at steps S20 to S28 are executed repetitively. For example, within a period within which a task T such as the application program is not executed, the standby unit 3 may execute polling of the reception queue 5 without using an interrupt process generated by a context switch. Since the polling is executed in the case where an executable task T does not exist in the task queue 6, also in the case where reception of information from the different apparatus 110 is to be decided by polling, stagnation of execution of the task T may be suppressed. It is to be noted that operation of the management unit 2 and operation of the standby unit 3 are executed exclusively as depicted in FIG. 2.

For example, before the processing is advanced from step S10 to step S20, the operation frequency of the arithmetic processing unit 1 is lowered in comparison with the operation frequency of the arithmetic processing unit 1 that processes steps S10 and S12, and the arithmetic processing unit 1 is switched from an normal mode to a standby mode in which power consumption is suppressed. Further, before the processing advances from step S26 to step S12, the operation frequency of the arithmetic processing unit 1 is returned to the original operation frequency in which steps S10 and S12 are processed, and the arithmetic processing unit 1 returns from the standby mode to the normal mode.

For example, the operation of the management unit 2 is executed in the normal mode in which the operation frequency is high in comparison with that in the standby mode, and the operation of the standby unit 3 is executed in the standby mode in which the operation frequency is low in comparison with that in the normal mode. By executing polling of the reception queue 5, for which a high speed is not demanded in comparison with that of a task T, in the standby mode, the power consumption of the arithmetic processing unit 1 and the information processing apparatus 100 may be reduced in comparison with that in the case of execution in the normal mode.

Figure 3:
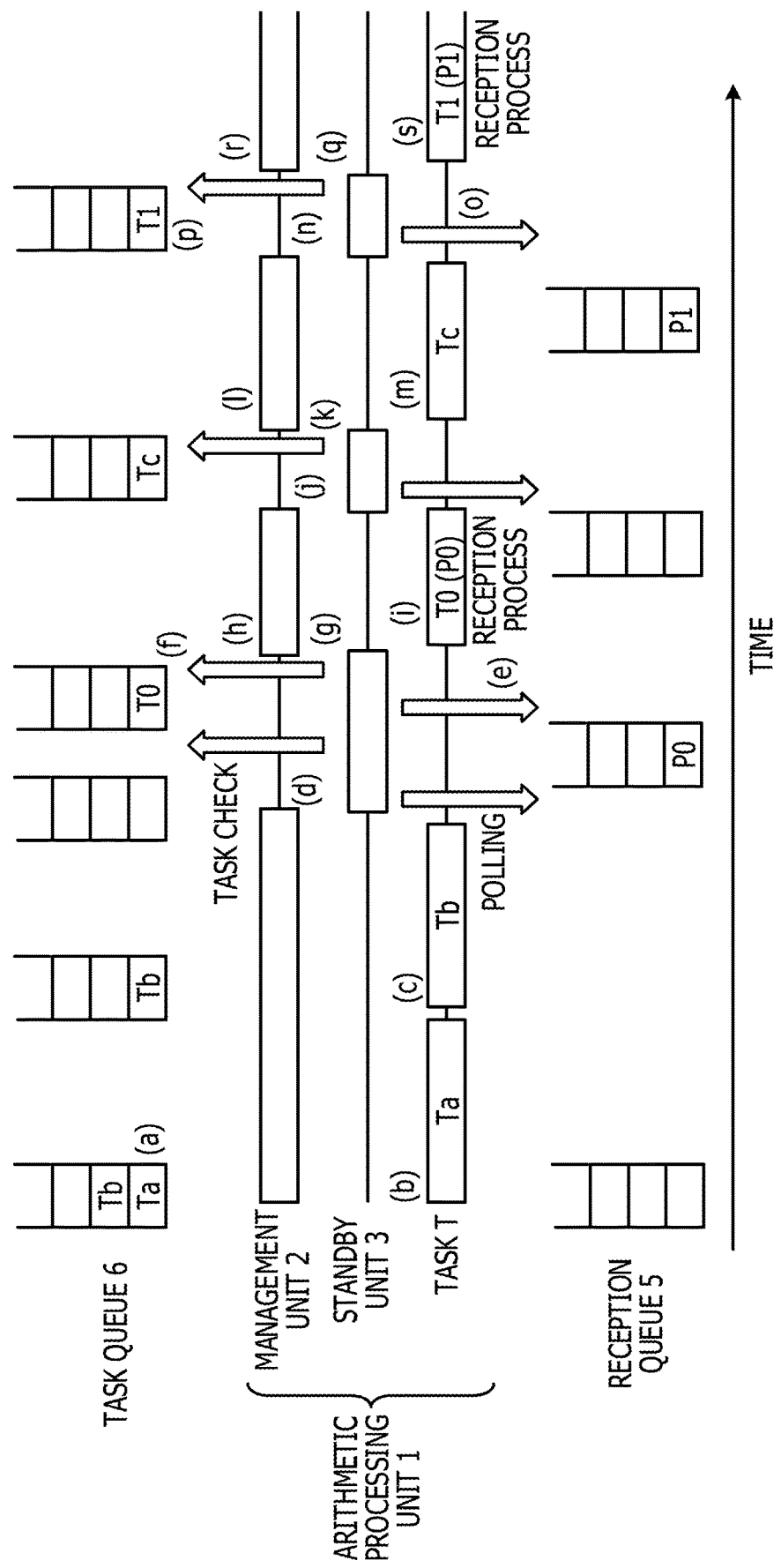
FIG. 3 is a view depicting an example of operation of an information processing apparatus depicted in FIG. 1.

FIG. 3 depicts an example of operation of the information processing apparatus 100 depicted in FIG. 1. Referring to FIG. 3, elongated rectangles depicted at the management unit 2, standby unit 3 and task T each indicate execution of a process. It is to be noted that, while the rectangle indicative of the process of the management unit 2 and the rectangle indicative of the process of the task T in FIG. 3 overlap with each other, actually the arithmetic processing unit 1 executes the processes time-divisionally without causing them to overlap with each other. Polling indicated by a downwardly directed arrow mark indicates the process at step S20 of FIG. 2, and a task check indicated by an upwardly directed arrow mark indicates the process at step S24 of FIG. 2.

In an initial state of FIG. 3, the task queue 6 retains tasks Ta and Tb ((a) of FIG. 3). The management unit 2 determines execution of the task Ta from between the tasks Ta and Tb retained in the task queue 6, and the arithmetic processing unit 1 executes the task Ta ((b) of FIG. 3). After the execution of the task Ta, the management unit 2 determines execution of the task Tb retained in the task queue 6, and the arithmetic processing unit 1 executes the task Tb ((c) of FIG. 3).

Since the task queue 6 becomes empty as a result of the execution of the task Tb, the management unit 2 stops its processing, and the standby unit 3 (idle routine) starts its processing in place of the management unit 2 ((d) of FIG. 3). As described hereinabove with reference to FIG. 2, the standby unit 3 executes polling and a task check alternately, and detects by the second time polling that the reception queue 5 has retained a packet P0 ((e) of FIG. 3). The arithmetic processing unit 1 executes polling within a period within which the task T is not executed but does not execute polling within another period within which any task T is executed. For example, polling is executed without competition with execution of the task T. Therefore, even in the case where reception of a packet from the different apparatus 110 is decided by polling, stagnation of execution of the task T may be suppressed.

In the example depicted in FIG. 3, the standby unit 3 requests the main body portion of the kernel for a reception process of a packet P0. The main body portion of the kernel stores a task T0 for executing a reception process of the packet P0 into the task queue 6 in accordance with the request for a reception process of a packet ((f) of FIG. 3). The standby unit 3 detects through the task check that an executable task T0 has retained in the task queue 6 ((g) of FIG. 3).

The management unit 2 starts its processing in place of the standby unit 3 and determines execution of the task T0 retained in the task queue 6 ((h) of FIG. 3). The arithmetic processing unit 1 starts execution of the task T0 and executes a reception process of the packet P0 retained in the reception queue 5 ((i) of FIG. 3). Since the task queue 6 is emptied as a result of the execution of the task T0, the management unit 2 stops its processing, and the standby unit 3 starts its processing in place of the management unit 2 ((j) of FIG. 3).

The standby unit 3 alternately executes polling and a task check and detects a task Tc retained newly into the task queue 6 by the task check, and then ends the processing ((k) of FIG. 3). The management unit 2 starts its processing in place of the standby unit 3 and determines execution of the task Tc retained in the task queue 6 ((l) of FIG. 3). The arithmetic processing unit 1 executes the task Tc ((m) of FIG. 3).

Since the task queue 6 is emptied as a result of the execution of the task Tc, the management unit 2 stops its processing and the standby unit 3 starts its processing in place of the management unit 2 ((n) of FIG. 3). The standby unit 3 detects through polling that the reception queue 5 retains a packet P1 ((o) of FIG. 3). The main body portion of the kernel requested for a reception process of the packet P1 from the standby unit 3 stores a task T1 for executing a reception process of the packet P1 into the task queue 6 ((p) of FIG. 3). The standby unit 3 detects through a task check that an executable task T1 has been retained into the task queue 6 and ends the processing ((q) of FIG. 3).

The management unit 2 starts its processing in place of the standby unit 3 and determines execution of the task T1 retained in the task queue 6 ((r) of FIG. 3). The arithmetic processing unit 1 starts execution of the task T1 and executes a reception process of the packet P1 retained in the reception queue 5 ((s) of FIG. 3).

As described above, in the embodiment depicted in FIGS. 1 to 3, also in the case where reception of a packet from the different apparatus 110 is decided through polling, stagnation of execution of the task T may be suppressed. For example, since polling is executed within a period of an idle routine within which the task T is not executed, polling of the reception queue 5 may be executed without degrading the processing performance of the task T by the information processing apparatus 100. Further, by executing polling of the reception queue 5 in the standby mode, the power consumption of the information processing apparatus 100 may be reduced in comparison with that in an alternative case in which polling is executed in the normal mode.

Figure 4:
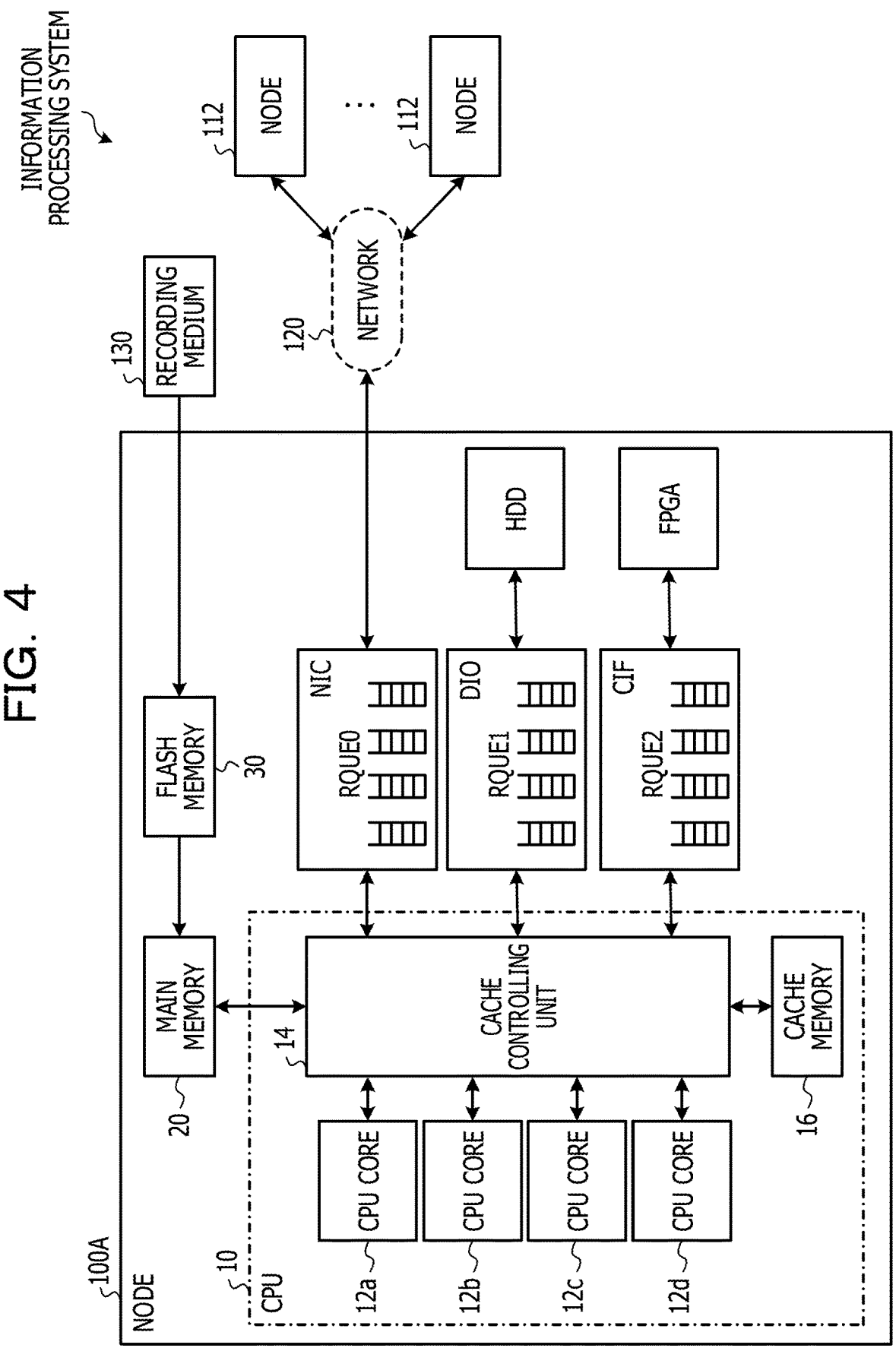
FIG. 4 is a view depicting another embodiment of an information processing apparatus, an information processing method and a program.

FIG. 4 depicts another embodiment of an information processing apparatus, an information processing method and a program. A node 100A depicted in FIG. 4 includes a CPU 10, a main memory 20, a flash memory 30, a network interface NIC (network interface controller), a disk interface DIO, a communication interface CIF, a hard disk drive (HDD) and a field-programmable gate array (FPGA). The CPU 10 includes a plurality of CPU cores 12 (12a, 12b, 12c and 12d), a cache controlling unit 14 and a cache memory 16. It is to be noted that the number of CPU cores 12 is not limited to four.

The node 100A is a server or the like used in the high performance computing (HPC) field and is an example of an information processing apparatus. Each of the CPU cores 12a to 12d is an arithmetic processing unit. The network interface NIC, disk interface DIO and communication interface CIF are each an example of a communication controlling unit. The node 100A is coupled to a different node 112 through a network 120, and an information processing system is constructed by the node 100A and the different node 112. The node 112, HDD and FPGA are each an example of a different apparatus.

The cache controlling unit 14 controls data to be inputted to the CPU core 12 and outputted from the CPU core 12 and controls data to be inputted to and outputted from the network interface NIC, disk interface DIO and communication interface CIF. For example, in the case where data of a readout target by the CPU core 12 is retained in the cache memory 16 (cache hit), the cache controlling unit 14 outputs the data read out from the cache memory 16 to the CPU core. In the case where data of a readout target by the CPU core 12 is not retained in the cache memory 16 (cache miss), the cache controlling unit 14 outputs the data read out from the main memory 20 to the CPU core and stores the data into the cache memory 16.

The main memory 20 retains data to be processed by the CPU cores 12a to 12d and various programs to be executed by the CPU cores 12a to 12d (application programs, operating system including the kernel and so forth). For example, the operating system is first transferred from the recording medium 130 or the like to the flash memory 30 and, upon activation of the node 100A, is transferred from the flash memory 30 to the main memory 20 and executed by the CPU cores 12a to 12d. An application program is transferred from the HDD to the main memory 20 in accordance with an activation instruction for the application program and is executed by one of the CPU cores 12a to 12d.

The network interface NIC includes a function for controlling communication between the CPU 10 and the network 120. The network interface NIC includes a plurality of reception queues RQUE0 for retaining a packet received from the different node 112 or the like through the network 120. For example, the network interface NIC includes four reception queues RQUE0 individually corresponding to the four CPU cores 12a to 12d. Although a packet retained in each reception queues RQUE0 is processed preferentially by the corresponding CPU core 12, the packet may be processed otherwise by a CPU core 12 other than the corresponding CPU core 12. The network interface NIC includes a transmission queue not depicted for retaining a packet to be outputted from each CPU core 12 to the network 120.

The disk interface DIO includes a function for controlling communication between the CPU 10 and the HDD. The disk interface DIO includes a plurality of reception queues RQUE1 for retaining a packet including data and so forth received from the HDD. For example, the disk interface DIO includes four reception queues RQUE1 individually corresponding to the CPU cores 12a to 12d. The disk interface DIO includes a transmission queue not depicted for retaining a packet including write data and so forth outputted from the CPU cores 12 to the HDD.

The communication interface CIF includes a function for controlling communication between the CPU 10 and the FPGA. The communication interface CIF includes a plurality of reception queues RQUE2 for retaining a packet including process data and so forth received from the FPGA. For example, the communication interface CIF includes four reception queues RQUE2 individually corresponding to the four CPU cores 12a to 12d. The communication interface CIF includes a transmission queue not depicted for retaining a packet including process data and so forth to be outputted from the CPU core 12 to the FPGA. It is to be noted that the reception queues RQUE0, RQUE1 and RQUE2 may be allocated to a given storage region of the main memory 20. In the following, an example in which the reception queues RQUE0, RQUE1 and RQUE2 are allocated to the main memory 20 is described. The reception queues RQUE0, RQUE1 and RQUE2 are an example of a retention unit for retaining a packet.

Figure 5:
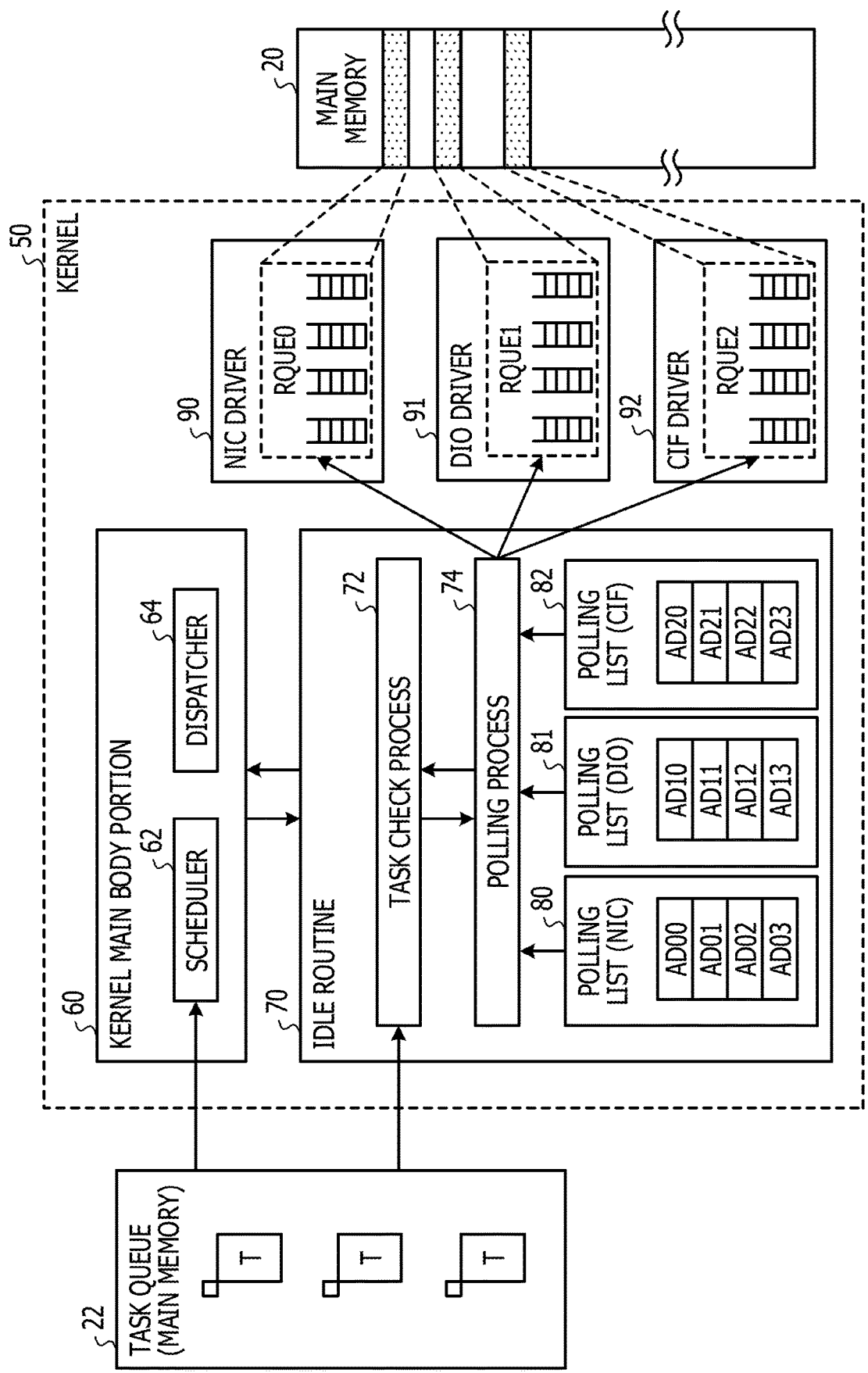
FIG. 5 is a view depicting an example of an outline of a kernel executed by each CPU core depicted in FIG. 4.

FIG. 5 depicts an example of an overview of the kernel 50 executed by each CPU core 12 depicted in FIG. 4. The kernel 50 includes a kernel main body portion 60, an idle routine 70, an NIC driver 90, a DIO driver 91 and a CIF driver 92. The kernel main body portion 60 is an example of a management unit, and the idle routine 70 is an example of a standby unit.

The kernel main body portion 60 includes a scheduler 62 that determines a task T to be executed from among the tasks T retained in a task queue 22, and a dispatcher 64 that causes the task T determined by the scheduler to be executed by a corresponding CPU core 12. It is to be noted that the task queue 22 is allocated, for example, to a storage region of the main memory 20. Processes to be executed by the kernel main body portion 60 and the idle routine 70 are executed exclusively.

The idle routine 70 includes a task check process 72 and a polling process 74. The task check process 72 refers to the task queue 22 or a flag indicative of a state of the task queue 22 to check whether or not an executable task T exists. The polling process 74 executes a process for polling the reception queues RQUE0, RQUE1 and RQUE2 based on address information retained by polling lists 80, 81 and 82 allocated to the main memory 20 or the like.

The polling list 80 retains addresses AD0 (AD00, AD01, AD02 and AD03) individually allocated to the four reception queues RQUE0 managed by the NIC driver 90, which controls operation of the network interface NIC (FIG. 4). The polling list 81 regains addresses AD1 (AD10, AD11, AD12 and AD13) individually allocated to the four reception queues RQUE1 managed by the DIO driver 91, which controls operation of the disk interface DIO (FIG. 4). The polling list 82 regains addresses AD2 (AD20, AD21, AD22 and AD23) individually allocated to the four reception queues RQUE2 managed by the CIF driver 92, which controls operation of the communication interface CIF (FIG. 4). The polling lists 80, 81 and 82 may be allocated to registers or the like provided in the CPU 10.

Operation of the kernel 50 depicted in FIG. 5 is similar to that of the operation flow depicted in FIG. 2 except that the operation is executed for each CPU core 12. For example, operation of the kernel main body portion 60 is similar to the operation of the management unit 2 of FIG. 2, and operation of the idle routine 70 is similar to the operation of the standby unit 3 depicted in FIG. 2.

The kernel 50 of each of the CPU cores 12a to 12d successively refers to the addresses AD of the polling lists 80, 81 and 82 in the polling process 74 of the idle routine 70 to poll the state of all of the reception queues RQUE0, RQUE1 and RQUE2. It is to be noted that, due to exclusive control by the kernels 50 of the CPU cores 12a to 12d, the plurality of CPU cores 12 do not execute a reception process of a same packet in an overlapping relationship.

Operation of the node 100A depicted in FIG. 4 is similar to the operation depicted in FIG. 3 except that the reception queues RQUE0, RQUE1 and RQUE2 are polled by the idle routine executed by the plurality of CPU cores 12a to 12d. For example, in the node 100A, the CPU cores 12a to 12d execute operation similar to the operation of the arithmetic processing unit 1 depicted in FIG. 3.

Figure 6:
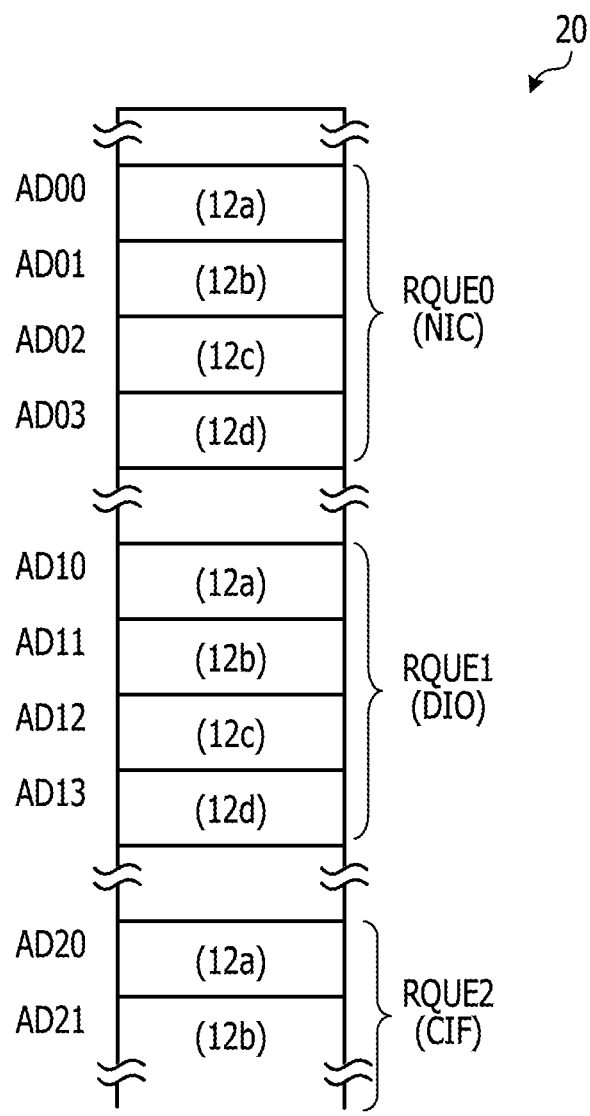
FIG. 6 is a view depicting an example of allocation of a reception queue depicted in FIG. 5 to a main memory.

FIG. 6 depicts an example of allocation of the reception queues RQUE0, RQUE1 and RQUE2 depicted in FIG. 5 to the main memory 20. In the network interface NIC, the reception queue RQUE0 corresponding to the CPU core 12a is allocated to a storage region of a given size whose top is the address AD00. The reception queue RQUE0 corresponding to the CPU core 12b is allocated to a storage region of the given size whose top is the address AD01. The reception queue RQUE0 corresponding to the CPU core 12c is allocated to a storage region of the given size whose top is the address AD02. The reception queue RQUE0 corresponding to the CPU core 12d is allocated to a storage region of the given size whose top is the address AD03.

Similarly, in the disk interface DIO, the four reception queues RQUE1 corresponding to the CPU cores 12a to 12d are individually allocated to storage regions of a given size whose top is each of addresses AD10, AD11, AD12 and AD13. In the communication interface CIF, the four reception queues RQUE2 corresponding to the CPU cores 12a to 12d are individually allocated to storage regions of a given size whose top is each of addresses AD20, AD21, AD22 and AD23.

In the embodiment depicted in FIGS. 4 to 6, by the idle routine executed by the CPU cores 12a to 12d, stagnation of execution of the task T may be suppressed by deciding reception of a packet from the different node 112, HDD or FPGA by polling. For example, by executing polling within a period of the idle routine within which no task T is executed, polling of the reception queues RQUE0, RQUE1 and RQUE2 may be executed without degrading the processing performance of a task T by the node 100A.

Figure 7:
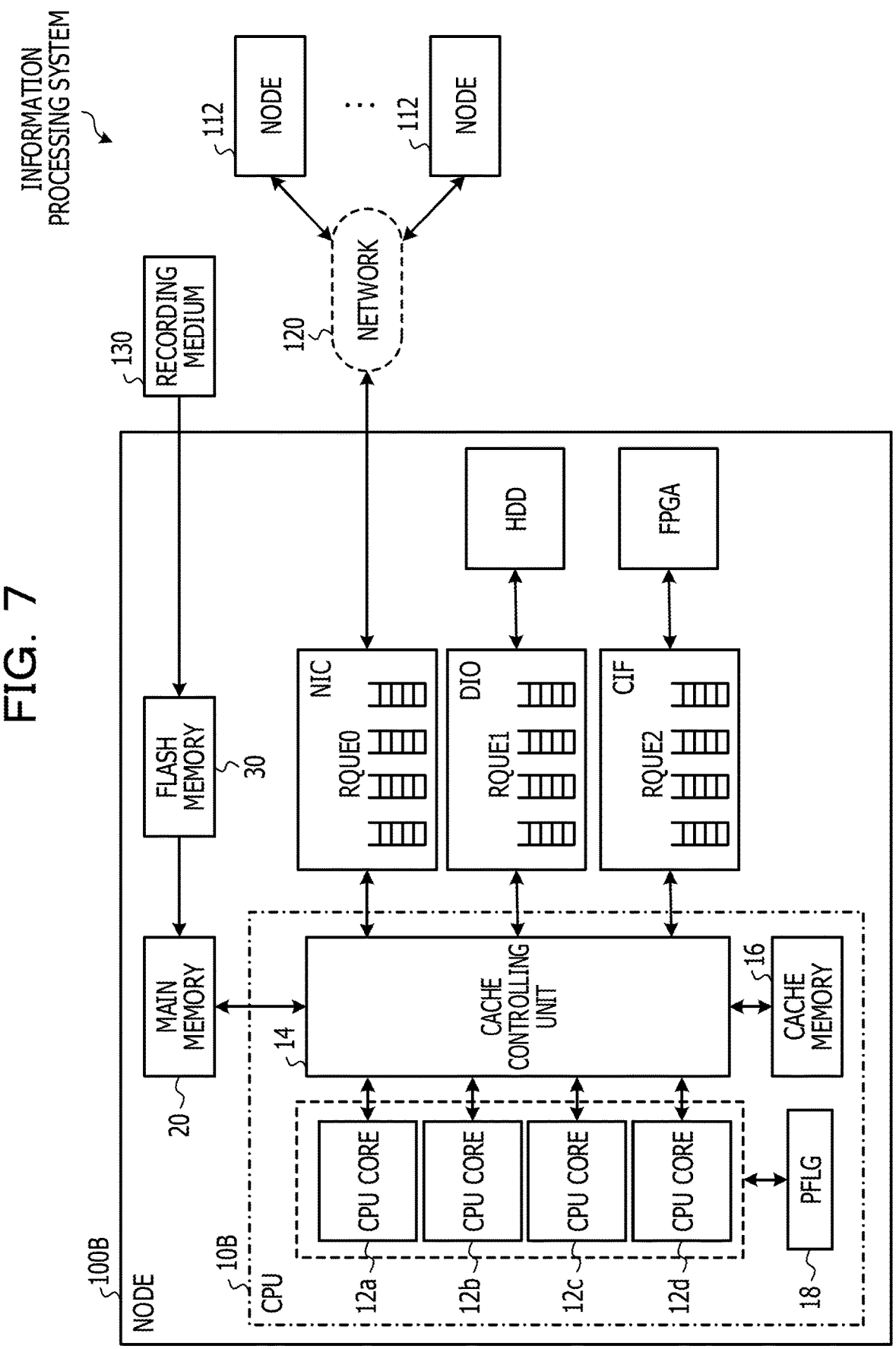
FIG. 7 is a view depicting a further embodiment of an information processing apparatus, an information processing method and a program.

FIG. 7 depicts a further embodiment of an information processing apparatus, an information processing method and a program. Elements same as or similar to the elements described with reference to FIG. 4 are denoted by the same reference symbols, and detailed description of them is omitted. A node 100B depicted in FIG. 7 is same as the node 100A depicted in FIG. 4 except that the node 100B includes a CPU 10B in place of the CPU 10 depicted in FIG. 4. The CPU 10B is same as the CPU 10 depicted in FIG. 4 except that the CPU 10B includes a polling flag PFLG that may be referred to and set by the CPU cores 12a, 12b, 12c and 12d.

The polling flag PFLG is provided to poll the reception queues RQUE0, RQUE1 and RQUE2 only by one of the kernels executed by the CPU cores 12a, 12b, 12c and 12d. For example, in the case where the polling flag PFLG is "0," this indicates that none of the CPU cores 12a, 12b, 12c and 12d is polling the reception queues RQUE0, RQUE1 and RQUE2. In the case where the polling flag PFLG is "1," this indicates that one of the CPU cores 12a, 12b, 12c and 12d is polling the reception queues RQUE0, RQUE1 and RQUE2.

An outline of the kernel executed by each CPU core 12 is same as the outline of the kernel depicted in FIG. 5 except that only the idle routine 70 for which the polling flag PFLG is set to "1" executes polling of the reception queues RQUE0 to RQUE2. For example, in the kernel executed by each of the CPU cores 12a to 12d depicted in FIG. 7, the idle routine 70 (FIG. 5) for which the polling flag PFLG is not set to "1" executes only the task check process 72.

Figure 8:
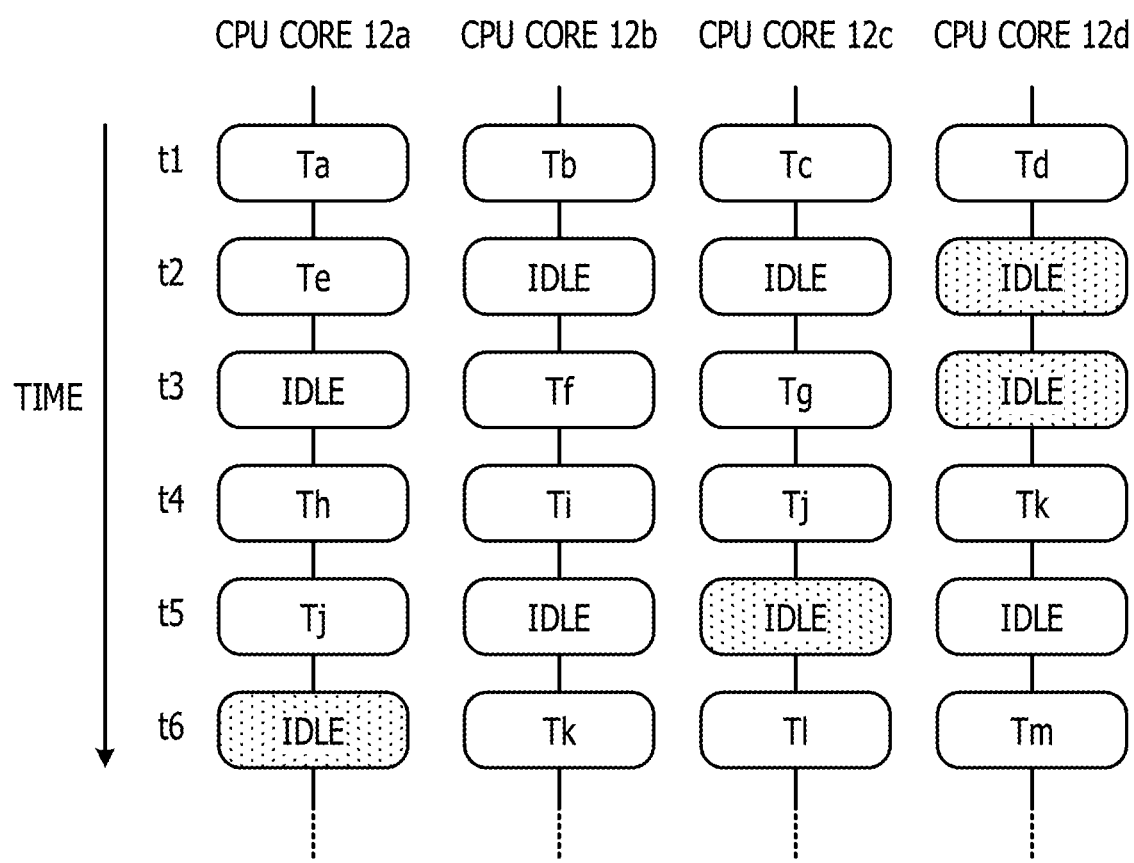
FIG. 8 is a view depicting an example of operation of each CPU core depicted in FIG. 7.
Figure 9:
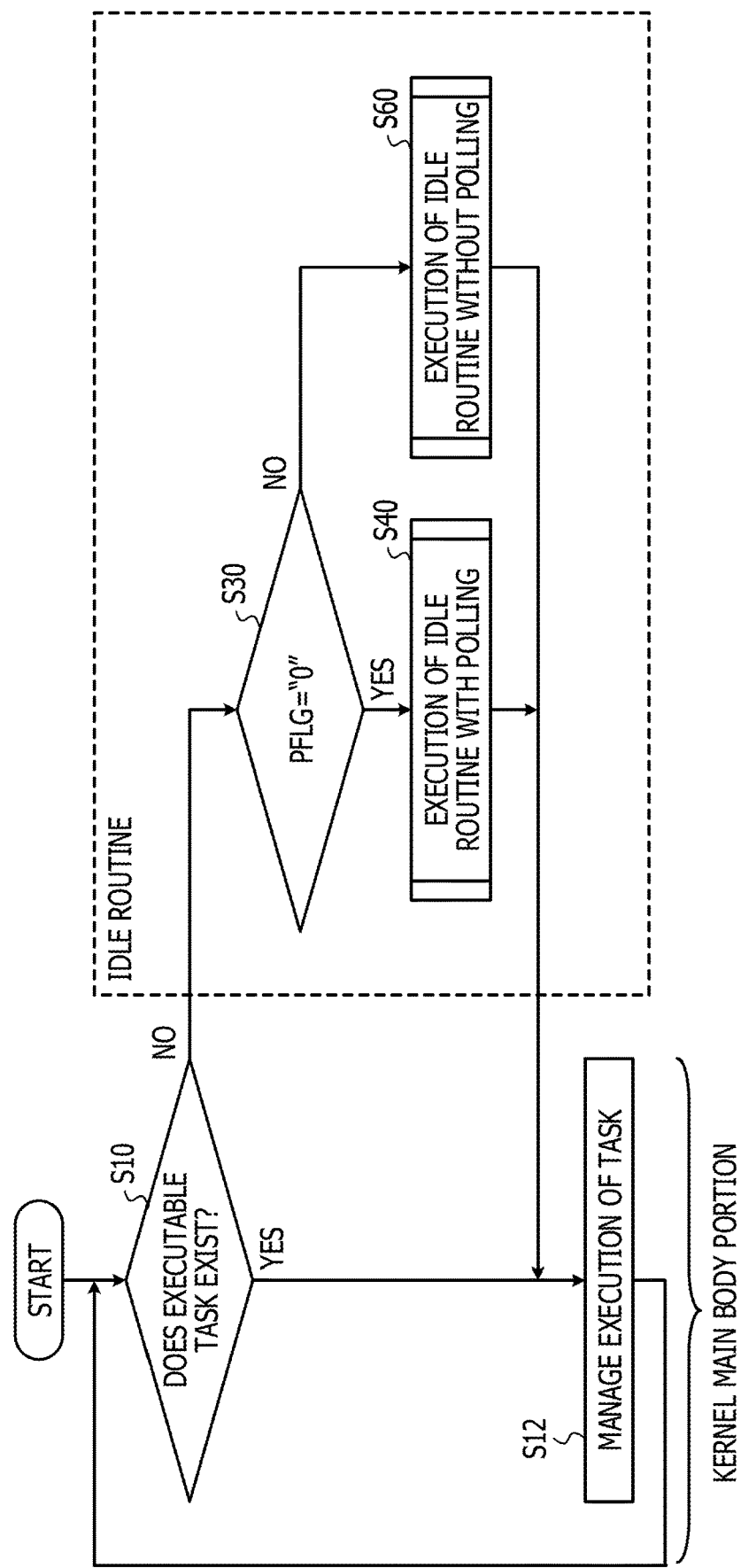
FIG. 9 is a view depicting an example of operation of a kernel executed by each CPU core depicted in FIG. 7.

FIG. 8 depicts an example of operation of the CPU cores 12a to 12d depicted in FIG. 7. In FIG. 8, it is assumed that, for the simplified description, the execution time period of each task T and the execution time period of an idle routine IDLE within which no task T is executed are substantially equal to each other. An example of processing executed by the idle routine IDLE is depicted in FIG. 9.

At time t1, the CPU cores 12a, 12b, 12c and 12d execute the tasks Ta, Tb, Tc and Td, respectively. Any CPU core 12 that is executing a task T does not execute the idle routine IDLE. At time t2, the CPU core 12a executes a task Te and the CPU cores 12b, 12c and 12d execute the idle routine IDLE. In FIG. 8, an idle routine IDLE indicated by shading indicates that polling of the reception queues RQUE0, RQUE1 and RQUE2 and a check of whether or not an executable task T exists are executed. Any void idle routine IDLE indicates that polling of the reception queues RQUE0, RQUE1 and RQUE2 is not executed and only a check of whether or not an executable task T exists is executed. For example, at time t2, only the CPU core 12d from among the CPU cores 12b, 12c and 12d that execute the idle routine IDLE executes polling of the reception queues RQUE0, RQUE1 and RQUE2. A CPU core 12 that executes the idle routine IDLE indicated by shading is an example of a first arithmetic processing unit, and a CPU core 12 that executes the idle routine IDLE indicated by void is an example of a second arithmetic processing unit.

At time t3, the CPU cores 12b and 12c execute tasks Tf and Tg, respectively, and the CPU cores 12a to 12d execute the idle routine IDLE. Polling of the reception queues RQUE0, RQUE1 and RQUE2 is executed continuously by the CPU cores 12 that are executing the idle routine IDLE from time t2.

Thereafter, also at time t4 to t6, in the case where a plurality of CPU cores 12 executing the idle routine IDLE exist, one of the CPU cores 12 executes polling of the reception queues RQUE0, RQUE1 and RQUE2. In the case where only one CPU core 12c exists which executes the idle routine IDLE, the CPU core 12 that executes the idle routine IDLE executes polling of the reception queues RQUE0, RQUE1 and RQUE2. In the case where no CPU core 12 exists which executes the idle routine IDLE, the idle routine IDLE is not executed.

It is to be noted that only one CPU core 12 determined in advance may execute polling of the reception queues RQUE0, RQUE1 and RQUE2 in the idle routine IDLE. For example, in the case where only the CPU core 12a executes polling of the reception queues RQUE0, RQUE1 and RQUE2, the polling is executed at time t3 and time t6 at which no task T is executed from among time t1 to t6. The CPU core 12a executes processing of the idle routine depicted in FIG. 2, and the other CPU cores 12b to 12d execute processing of the idle routine depicted in FIG. 2 from which steps S20 and S22 are excluded. In the case where only one CPU core 12 determined in advance executes polling of the reception queues RQUE0, RQUE1 and RQUE2, the process for determining which one of the CPU cores 12a to 12d is to execute polling is not executed. Therefore, the process of the idle routine may be simplified in comparison with that in an alternative case in which it is determined by which one of the CPU cores 12a to 12d polling is to be executed.

FIG. 9 depicts an example of operation of the kernel executed by each of the CPU cores 12a to 12d depicted in FIG. 7. For example, FIG. 9 depicts an example of an information processing method executed by the node 100B that is an example of an information processing apparatus and a program to be executed by each CPU core 12 of the node 100B. Processes same as those in FIG. 2 are denoted by the same reference symbols and detailed description of them is omitted herein.

In the case where an executable task T exists first at step S10, the kernel advances the processing to step S12, but in the case no executable task T exists, the kernel advances the processing to step S30. At step S12, the kernel manages execution of the task T and returns its processing to step S10. The processes at steps S10 and S12 are executed by the kernel main body portion 60 depicted in FIG. 5.

In the case where the polling flag PFLG is "0" at step S30, since there exists no CPU core 12 that is polling a reception queue RQUE, the idle routine advances the processing to step S40 in order to poll the reception queue RQUE. On the other hand, in the case where the polling flag PFLG is not "0" (for example, is "1"), since a CPU core 12 that is polling the reception queue RQUE exists already, the idle routine advances the processing to step S60.

Figure 10:
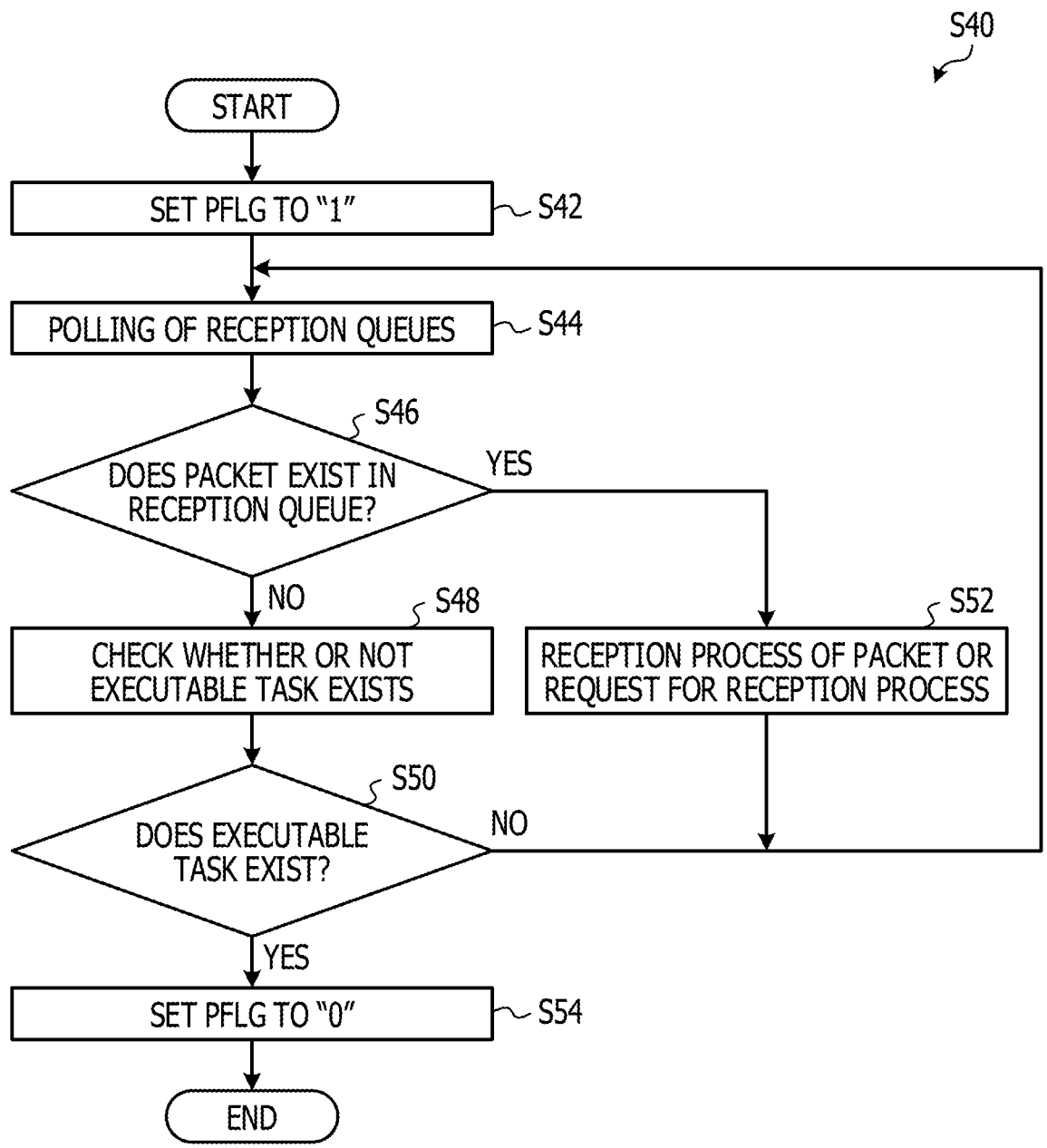
FIG. 10 is a view depicting an example of a process at step S40 depicted in FIG. 9.
Figure 13:
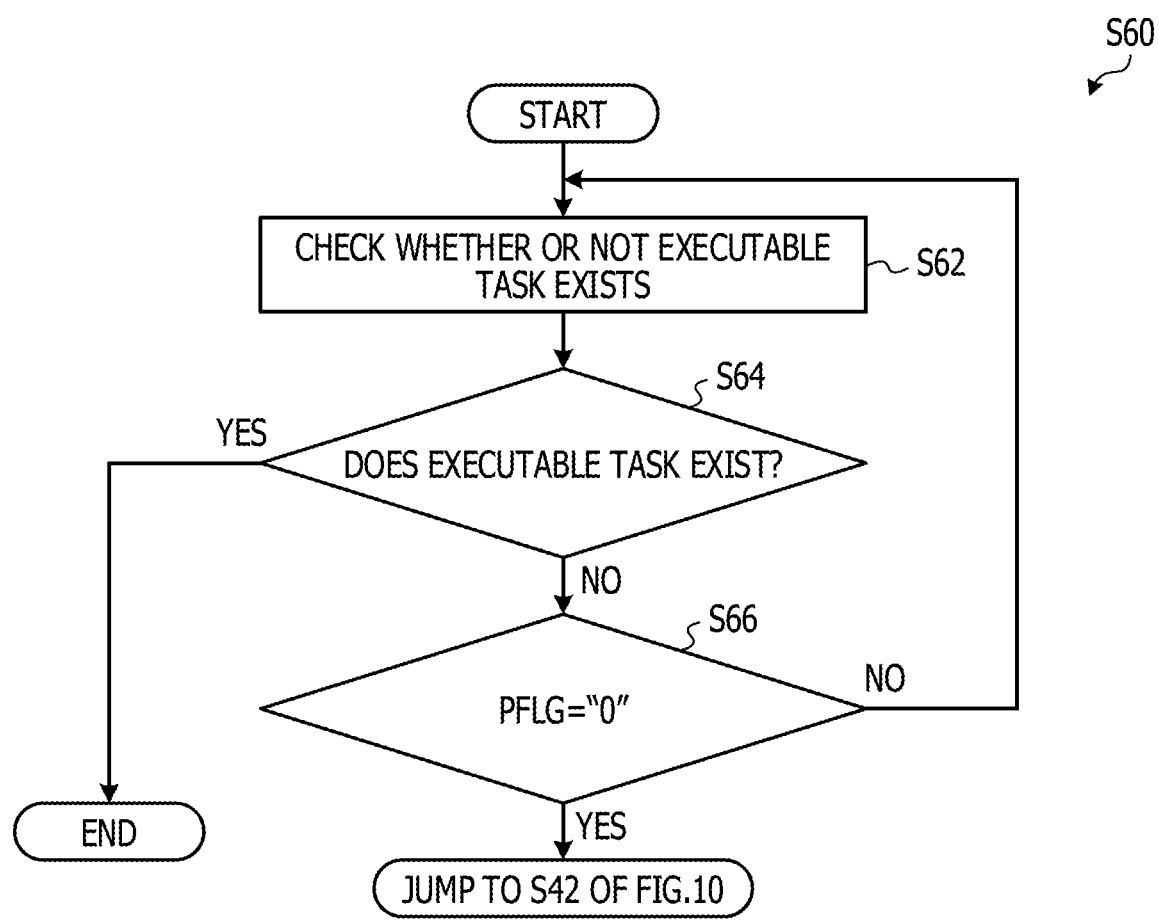
FIG. 13 is a view depicting an example of a process at step S60 depicted in FIG. 9.

At step S40, the idle routine executes the process for polling the reception queues RQUE0, RQUE1 and RQUE2 depicted in FIG. 7 and a process for checking whether or not an executable task T exists. At step S60, the idle routine executes a process for checking whether or not an executable task T exists without polling the reception queues RQUE0, RQUE1 and RQUE2. After steps S40 and S60, the processing is advanced to step S12. An example of the process at step S40 is depicted in FIG. 10, and an example of the process at step S60 is depicted in FIG. 13. The processes at steps S30, S40 and S60 are executed by the idle routine 70 depicted in FIG. 5.

The polling flag PFLG is set to "1" in the process at step S40 hereinafter described. The other CPU cores 12 that execute the idle routine after the polling flag PFLG is set to "1" execute the process at step S60 in which polling of the reception queue RQUE is not executed. For example, the process at step S40 in which polling of the reception queue RQUE is not executed is executed by only one of the CPU cores 12 while the other CPU cores 12 do not execute polling of the reception queue RQUE. Consequently, it is possible to suppress polling of the reception queue RQUE from being executed in an overlapping relationship by the CPU cores 12a to 12d, and it is possible to reduce the total number of commands to be executed by the CPU cores 12a to 12d. As a result, the power consumption of the CPU 10B may be reduced in comparison with that in an alternative case in which all of the CPU cores 12a to 12d execute polling of the reception queue RQUE.

In the meantime, in the case where all of the CPU cores 12a to 12d execute polling of the reception queue RQUE and a plurality of CPU cores 12 detect reception of a packet in an overlapping relationship with each other, an arbitration process for determining a CPU core 12 that is to execute the reception process of the packet is executed. In contrast, in the case where one CPU core 12 executes polling of the reception queue RQUE, the arbitration process may be omitted, and the power consumption of the CPU 10B may be reduced further.

It is to be noted that, similarly as in FIG. 2, the operation frequency of the CPU core 12 in the standby mode in which the idle routine is executed is set low in comparison with the operation frequency of the CPU core 12 in the normal mode in which the kernel main body portion is executed. Consequently, the power consumption of the node 100B may be reduced in comparison with that in an alternative case in which polling of the reception queue RQUE is executed in the normal mode.

FIG. 10 depicts an example of a process at step S40 depicted in FIG. 9. Description of processes same as those in FIG. 2 is omitted. Processes at steps S44, S46, S48, S50 and S52 depicted in FIG. 10 are similar to those at steps S20, S22, S24, S26 and S28 depicted in FIG. 2, respectively.

First at step S42, the idle routine sets the polling flag PFLG to "1." Consequently, the CPU core 12 that executes step S40 depicted in FIG. 10 exclusively executes polling of the reception queue RQUE. Then at step S44, the idle routine polls the reception queues RQUE0, RQUE1 and RQUE2. Then, in the case where some packet exists in one of the reception queues RQUE0, RQUE1 and RQUE2 at step S46, the idle routine advances the processing to step S52. In the case where no packet exists in any of the reception queues RQUE0, RQUE1 and RQUE2, the idle routine advances the processing to step S48. At step S52, the idle routine executes a reception process of the packet or requests the kernel main body portion 60 (FIG. 5) to perform a reception process of the packet, and advances the processing to step S44.

At step S48, the idle routine refers, for example, to the task queue 22 (FIG. 5) to check whether or not an executable task T exists. Then, in the case where an executable task T exists in the task queue 22 at step S50, the idle routine advances the processing to step S54, but in the case where an executable task T does not exist in the task queue 22, the idle routine advances the processing to step S44. In the case where it is detected that an executable task T exists in the task queue 22 at step S50, the idle routine is ended and processing of the kernel main body portion is executed. In this case, in order to leave execution of polling of the reception queue RQUE to the different CPU core 12, the idle routine sets the polling flag PFLG to "0" at step S54 and ends the processing.

Figure 11:
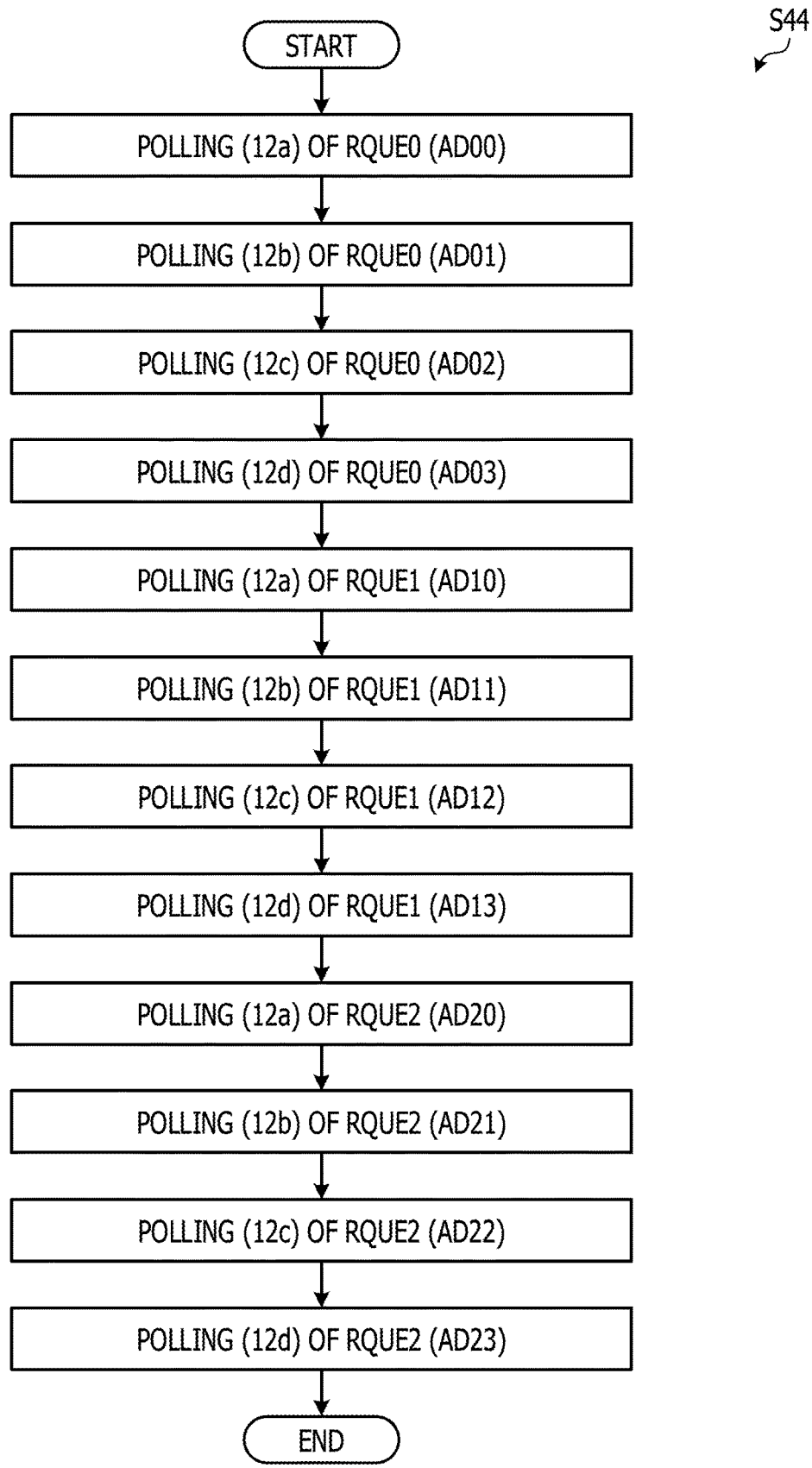
FIG. 11 is a view depicting an example of a process at step S44 depicted in FIG. 10.

FIG. 11 depicts an example of the process at step S44 depicted in FIG. 10. The idle routine by which "0" of the polling flag PFLG is detected successively executes polling of all of the reception queues RQUE0, RQUE1 and RQUE2 at step S44. Consequently, polling of any reception queue RQUE corresponding to the CPU core 12a that is executing the task T may be executed as well as polling of any reception queue RQUE corresponding to a CPU core 12 in which an executable task T does not exist. Accordingly, the polling of the reception queues RQUE may be executed equally without depending upon the state of the CPU cores 12. Further, since only the idle routine executed by one of the CPU cores 12 performs polling of the reception queue RQUE, control of polling may be simplified in comparison with that in an alternative case in which polling is performed by a plurality of CPU cores 12a to 12d.

Figure 12:
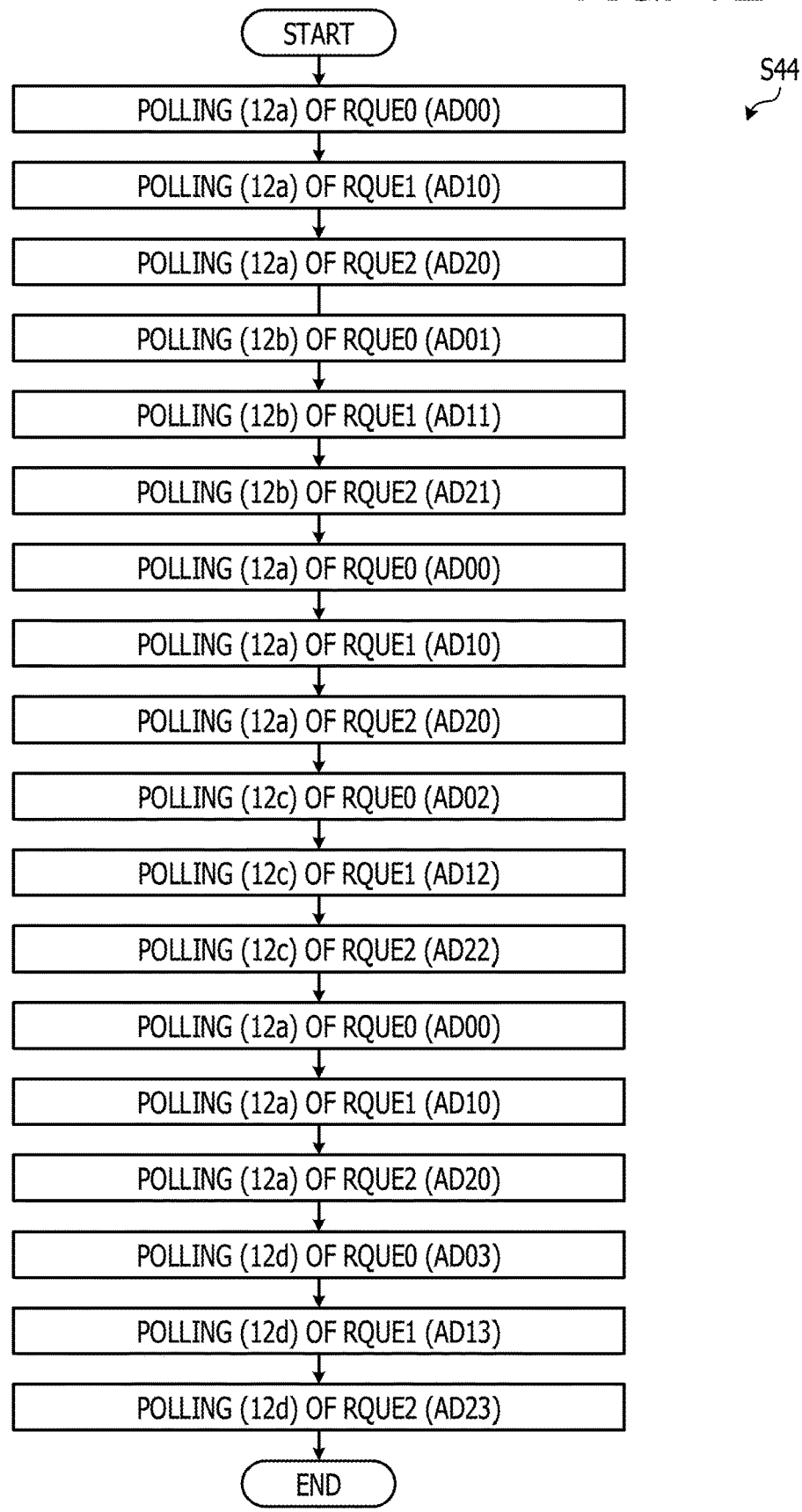
FIG. 12 is a view depicting another example of a process at step S44 depicted in FIG. 10.

FIG. 12 depicts another example of a process at step S44 depicted in FIG. 10. The example depicted in FIG. 12 indicates an example of a case in which the kernel of the CPU core 12a from among the CPU cores 12a to 12d executes the idle routine with polling depicted in FIG. 10.

At step S44, the CPU core 12a successively performs polling of the reception queues RQUE0 (AD00), RQUE1 (AD10) and RQUE2 (AD20) allocated to the CPU core 12a.

Thereafter, the CPU core 12a successively performs polling of the reception queues RQUE0 (AD01), RQUE1 (AD11) and RQUE2 (AD21) allocated to the CPU core 12b.

Thereafter, the CPU core 12a successively performs polling of the reception queues RQUE0 (AD00), RQUE1 (AD10) and RQUE2 (AD20) allocated to the CPU core 12a. Thereafter, the CPU core 12a successively performs polling of the reception queues RQUE0 (AD02), RQUE1 (AD12) and RQUE2 (AD22) allocated to the CPU core 12c, whereafter the process at step S44 for the second time is ended.

Then, the CPU core 12a successively performs polling of the reception queues RQUE0 (AD00), RQUE1 (AD10) and RQUE2 (AD20) allocated to the CPU core 12a. Thereafter, the CPU core 12a successively performs polling of the reception queues RQUE0 (AD03), RQUE1 (AD13) and RQUE2 (AD23) allocated to the CPU core 12d, whereafter the process at step S44 is ended.

For example, in the example depicted in FIG. 12, the CPU core 12 that executes the process at step S44 alternately executes polling of the reception queue RQUE corresponding to the own CPU core 12 and polling of the reception queue RQUE corresponding to a different CPU core 12. Consequently, the CPU core 12 may preferentially execute polling of the reception queue RQUE corresponding to the own CPU core 12 and may preferentially execute the task T to be executed by the own CPU core 12.

FIG. 13 depicts an example of the process at step S60 depicted in FIG. 9. Description of processes same as those in FIG. 2 is omitted herein. Processes at steps S62 and S64 depicted in FIG. 13 are similar to those at steps S24 and S26 depicted in FIG. 2, respectively.

First, at step S62, the idle routine refers, for example, to the task queue 22 (FIG. 5) to check whether or not an executable task T exists. Then, in the case where an executable task T exists in the task queue 22 at step S64, the idle routine ends the processing, but in the case where an executable task T does not exist in the task queue 22, the idle routine advances the processing to step S66.

In the case where the polling flag PFLG is "0" at step S66, the idle routine decides that a CPU core 12 that is polling the reception queue RQUE does not exist. In this case, the idle routine jumps the processing to step S42 of FIG. 10 in order to poll the reception queue RQUE. On the other hand, in the case where the polling flag PFLG is not "0" (for example, is "1"), the idle routine decides that a CPU core 12 that is polling the reception queue RQUE exists already. In this case, in order to check only whether or not an executable task T exists, the idle routine advances the processing to step S62.

Also in the embodiment described above with reference to FIGS. 7 to 13, similarly as in the embodiments depicted in FIGS. 1 to 6, also in the case where reception of a packet from the different node 112, HDD or FPGA is decided through polling, stagnation of execution of the task T may be suppressed. Further, by executing polling of the reception queue RQUE in the standby mode, the power consumption of the node 100B may be reduced in comparison with that in an alternative case in which polling is executed in the normal mode.

Further, in the embodiment depicted in FIGS. 7 to 13, since only one of the CPU cores 12 executes polling of the reception queue RQUE, polling of the reception queue RQUE may be suppressed from being executed in an overlapping relationship by a plurality of CPU cores 12. Consequently, the total number of commands to be executed by the CPU cores 12a to 12d may be reduced, and the power consumption of the CPU 10B may be reduced in comparison with that in an alternative case in which polling of the reception queue RQUE is performed by all of the CPU cores 12a to 12d.

Where one CPU core 12 performs polling of all reception queues RQUE, polling of any reception queue RQUE corresponding to the CPU core 12a that is executing the task T may be executed as well as polling of any reception queue RQUE corresponding to a CPU core 12 in which an executable task T does not exist. Accordingly, the polling of the reception queues RQUE may be executed equally without depending upon the state of the CPU cores 12. Further, since only the idle routine executed by one of the CPU cores 12 performs polling of the reception queue RQUE, control of polling may be simplified in comparison with that in an alternative case in which polling is performed by a plurality of CPU cores 12a to 12d.

Since one CPU core 12 alternately performs polling of the reception queue RQUE corresponding to the own CPU core 12 and polling of the reception queue RQUE corresponding to a different CPU core 12, the CPU core 12 may preferentially execute polling of the reception queue RQUE corresponding to the own CPU core 12. As a result, the task T to be executed by the own CPU core 12 may be executed preferentially.

Figure 14:
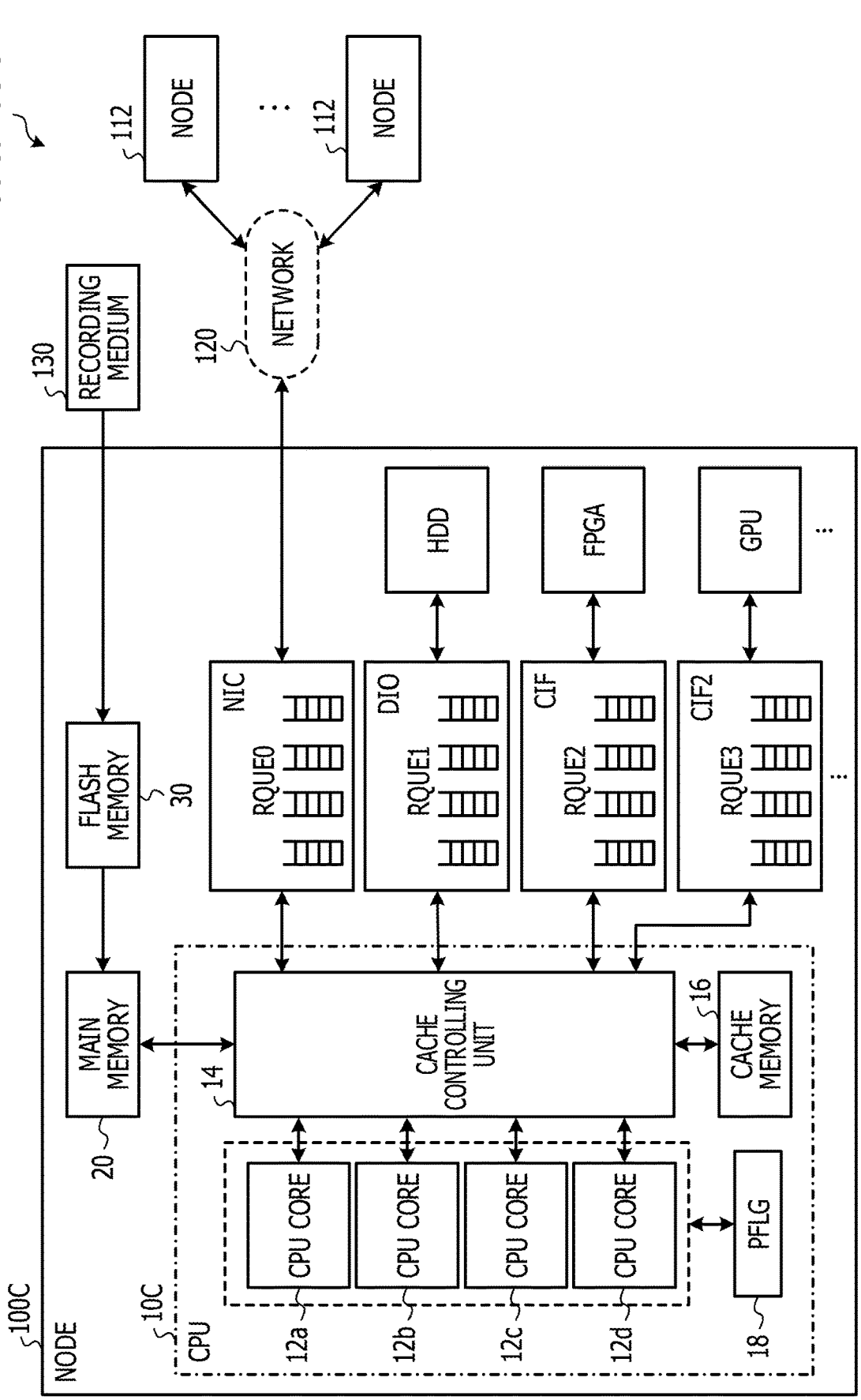
FIG. 14 is a view depicting a still further embodiment of an information processing apparatus, an information processing method and a program.

FIG. 14 depicts a still further embodiment of an information processing apparatus, an information processing method and a program. Elements same as or similar to the elements described with reference to FIGS. 4 and 7 are denoted by the same reference symbols, and detailed description of them is omitted.

A node 100C depicted in FIG. 14 includes a CPU 10C in place of the CPU 10B depicted in FIG. 7. The node 100C includes a processor such as a graphics processing unit (GPU), and a communication interface CIF2 that controls communication between the CPU 10C and an FPGA. The communication interface CIF2 is an example of a communication controlling unit, and the GPU is an example of a different apparatus. The configuration of the other part of the CPU 10C is similar to that of the CPU 10B depicted in FIG. 7. An outline of the kernel executed by each CPU core 12 is same as the outline of the kernel depicted in FIG. 5 except that the kernel includes a CIF2 driver that controls operation of the communication interface CIF2.

The communication interface CIF2 includes a plurality of reception queues RQUE3 that retain a packet including data and so forth received from the GPU. For example, the communication interface CIF2 includes four reception queues RQUE3 individually corresponding to the four CPU cores 12a to 12d. The communication interface CIF2 includes a transmission queue not depicted for retaining packets including processing data and so forth to be outputted from each of the CPU cores 12a to 12d to the GPU.

Figure 15:
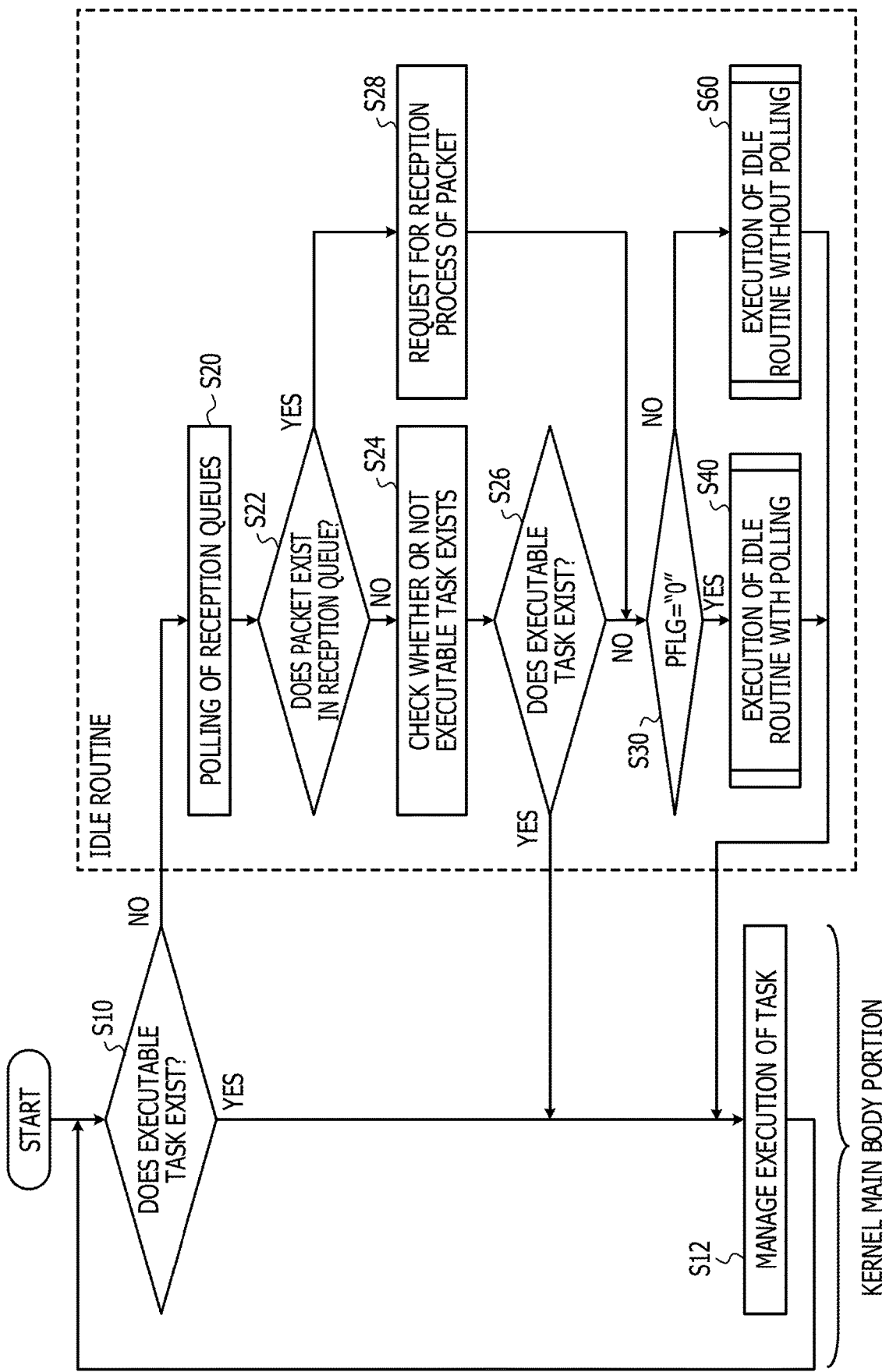
FIG. 15 is a view depicting an example of operation of a kernel executed by each CPU core depicted in FIG. 14.

FIG. 15 depicts an example of operation of the kernel executed by each CPU core depicted in FIG. 14. For example, FIG. 15 depicts an example of an information processing method executed by the node 100C that is an example of an information processing apparatus and a program executed by each CPU core 12 of the node 100C. Processes same as those in FIGS. 2 and 9 are denoted by the same reference symbols, and detailed description of them is omitted herein. Processes at steps S10 and S12 are same as those at steps S10 and S12 depicted in FIG. 2. The processes at steps S10 and S12 are executed by the kernel main body portion 60 depicted in FIG. 5.

Processes at steps S20, S22, S24, S26 and S28 are same as the processes at steps S20, S22, S24, S26 and S28 depicted in FIG. 3, respectively, except that the processing advances to step S30 after each of steps S26 and S28. Processes at steps S30, S40 and S60 are same as the processes at steps S30, S40 and S60 depicted in FIG. 9, respectively. Processes at steps S20, S22, S24, S26, S28, S30, S40 and S60 are executed by the idle routine 70 depicted in FIG. 5.

In the idle routine depicted in FIG. 15, before decision of the polling flag PFLG by step S30 is executed, polling of a reception queue RQUE and a check of whether or not an executable task T exists are executed once. For example, in the present embodiment, all idle routines are executed in regard to polling of a reception queue RQUE and a check of whether or not an executable task T exists once irrespective of the value of the polling flag PFLG.

For example, as indicated at time t1 and time t2 (or time t4 and time t5) of FIG. 8, there is the possibility that a plurality of packets may be stored into a plurality of reception queues RQUE during execution of a task T by all of the CPU cores 12. The possibility that a packet may be stored into a plurality of reception queues RQUE during execution of a task T increases as the number of network interfaces NIC, disk interfaces DIO and communication interfaces CIF increases. In this case, by polling the reception queue RQUE at the beginning of the idle routine irrespective of the value of the polling flag PFLG, the packet retained in the reception queue RQUE may be processed efficiently by a plurality of CPU cores 12. As a result, stagnation of the reception process of packets may be suppressed.

It is to be noted that the processes at steps S20, S22, S24, S26 and S28 may be executed repetitively by a plural number of times before the process at step S30 is executed. Further, similarly as in FIG. 2, the operation frequency of the CPU cores 12 in the standby mode in which the idle routine is executed is set low in comparison with the operation frequency of the CPU cores 12 in the normal mode in which the kernel main body portion is executed. Consequently, the power consumption of the node 100C may be reduced in comparison with that in an alternative case in which polling of the reception queue RQUE is executed in the normal mode.

Also in the embodiment depicted in FIGS. 14 and 15, similarly as in the embodiments depicted in FIGS. 1 to 13, stagnation of execution of the task T may be suppressed also in the case where reception of a packet from the different node 112, HDD, FPGA or GPU is decided by polling. By executing polling of the reception queue RQUE in the standby mode, the power consumption of the node 100C may be reduced in comparison with that in the case of execution in the normal mode.

Further, in the embodiment depicted in FIGS. 14 and 15, by polling the reception queue RQUE at the beginning of the idle routine irrespective of the value of the polling flag PFLG, packets retained in the reception queue RQUE may be processed efficiently. As a result, stagnation of the reception process of packets may be suppressed.

Figure 16:
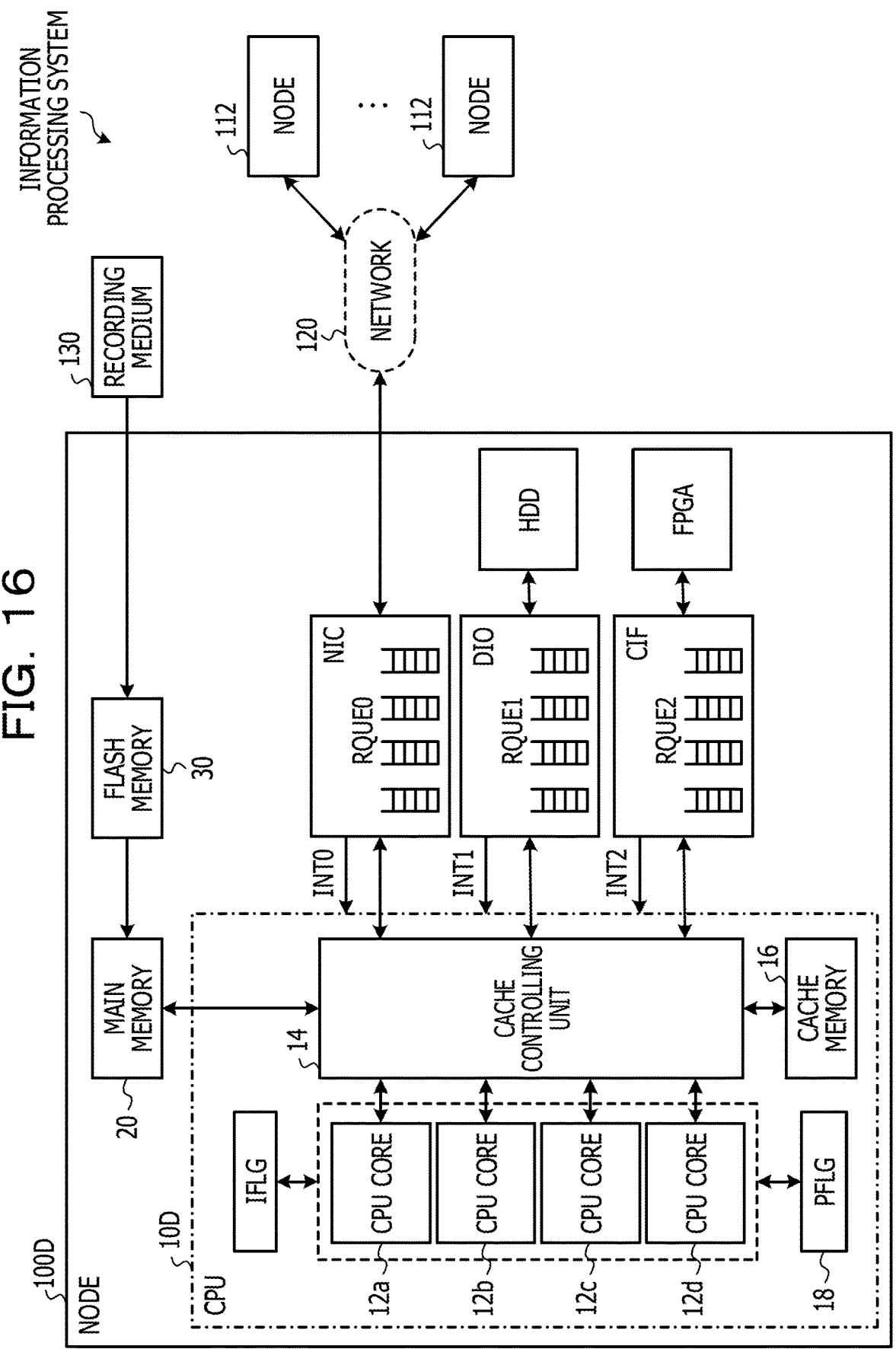
FIG. 16 is a view depicting a yet further embodiment of an information processing apparatus, an information processing method and a program.

FIG. 16 depicts a yet further embodiment of an information processing apparatus, an information processing method and a program. Elements same as or similar to the elements described with reference to FIGS. 4 and 7 are denoted by the same reference symbols, and detailed description of them is omitted. A node 100D depicted in FIG. 16 is similar to the node 100B depicted in FIG. 7 except that the node 100D includes a CPU 10D in place of the CPU 10B depicted in FIG. 7.

The CPU 10D includes an interrupt flag IFLG that may be referred to and set by the CPU cores 12a, 12b, 12c and 12d. Further, the CPU 10D includes a function for receiving interrupt signals INT0, INT1 and INT2 from the network interface NIC, disk interface DIO and communication interface CIF, respectively. The other functions of the CPU 10D are same as the functions of the CPU 10B depicted in FIG. 7. An outline of the kernel executed by each of the CPU cores 12 is same as an outline of the kernel depicted in FIG. 5.

The network interface NIC includes an interrupt operation mode in which the network interface NIC outputs the interrupt signal INT0 when a packet is stored into the reception queue RQUE0. The disk interface DIO includes an interrupt operation mode in which the disk interface DIO outputs the interrupt signal INT1 when a packet is stored into the reception queue RQUE1. The communication interface CIF includes an interrupt operation mode in which the communication interface CIF outputs the interrupt signal INT2 when a packet is stored into a reception queue RQUE2.

The interrupt flag IFLG of "0" indicates that the network interface NIC, disk interface DIO and communication interface CIF are each in a non-interrupt operation mode in which they do not output the interrupt signal INT0, INT1 or INT2. In the non-interrupt operation mode, each CPU core 12 detects a packet retained in the reception queue RQUE by polling. The interrupt flag IFLG of "1" indicates that the network interface NIC, disk interface DIO and communication interface CIF are each in an interrupt operation mode in which they output the interrupt signal INT0, INT1 or INT2. In the interrupt operation mode, each CPU core 12 detects a packet retained in the reception queue RQUE through the interrupt signal INT0, INT1 or INT2. For example, in the interrupt operation mode, each CPU core 12 does not poll the reception queue 5. It is to be noted that the interrupt flag IFLG is reset to "0" upon initialization when the power supply to the node 100D is made available or in a like case.

Figure 17:
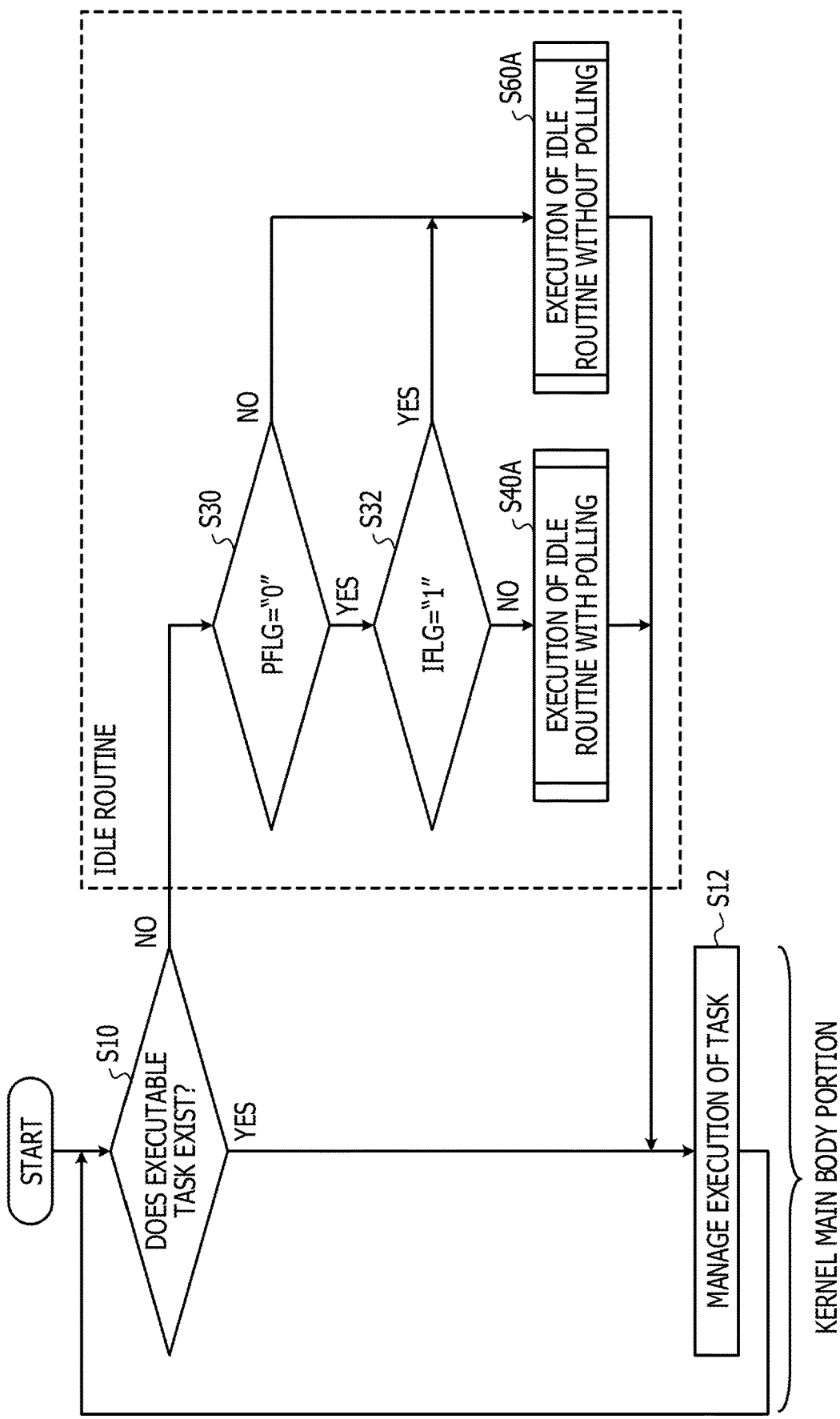
FIG. 17 is a view depicting an example of operation of a kernel executed by each CPU core depicted in FIG. 16.

FIG. 17 depicts an example of operation of the kernel executed by each CPU core depicted in FIG. 16. For example, FIG. 17 depicts an example of an information processing method executed by the node 100D that is an example of an information processing apparatus and a program executed by each CPU core 12 of the node 100D. Processes same as those in FIGS. 2 and 9 are denoted by the same reference symbols, and detailed description of them is omitted herein. Processes at steps S10 and S12 are same as those at steps S10 and S12 depicted in FIG. 9 and are executed by the kernel main body portion 60 depicted in FIG. 5.

In the case where a polling flag PFLG is "0" at step S30, the idle routine advances its processing to step S32, but in the case where the polling flag PFLG is not "0" (for example, is "1"), the idle routine advances the processing to step S60A. At step S60A, the idle routine that does not poll the reception queues RQUE0, RQUE1 and RQUE2 is executed.

In the case where the interrupt flag IFLG is "1" at step S32, since the idle routine does not poll the reception queue 5, the idle routine advances the processing to step S60A. On the other hand, in the case where the interrupt flag IFLG is not "1" (for example, is "0"), since the idle routine polls the reception queue 5, the idle routine advances the processing to step S40A.

Figure 18:
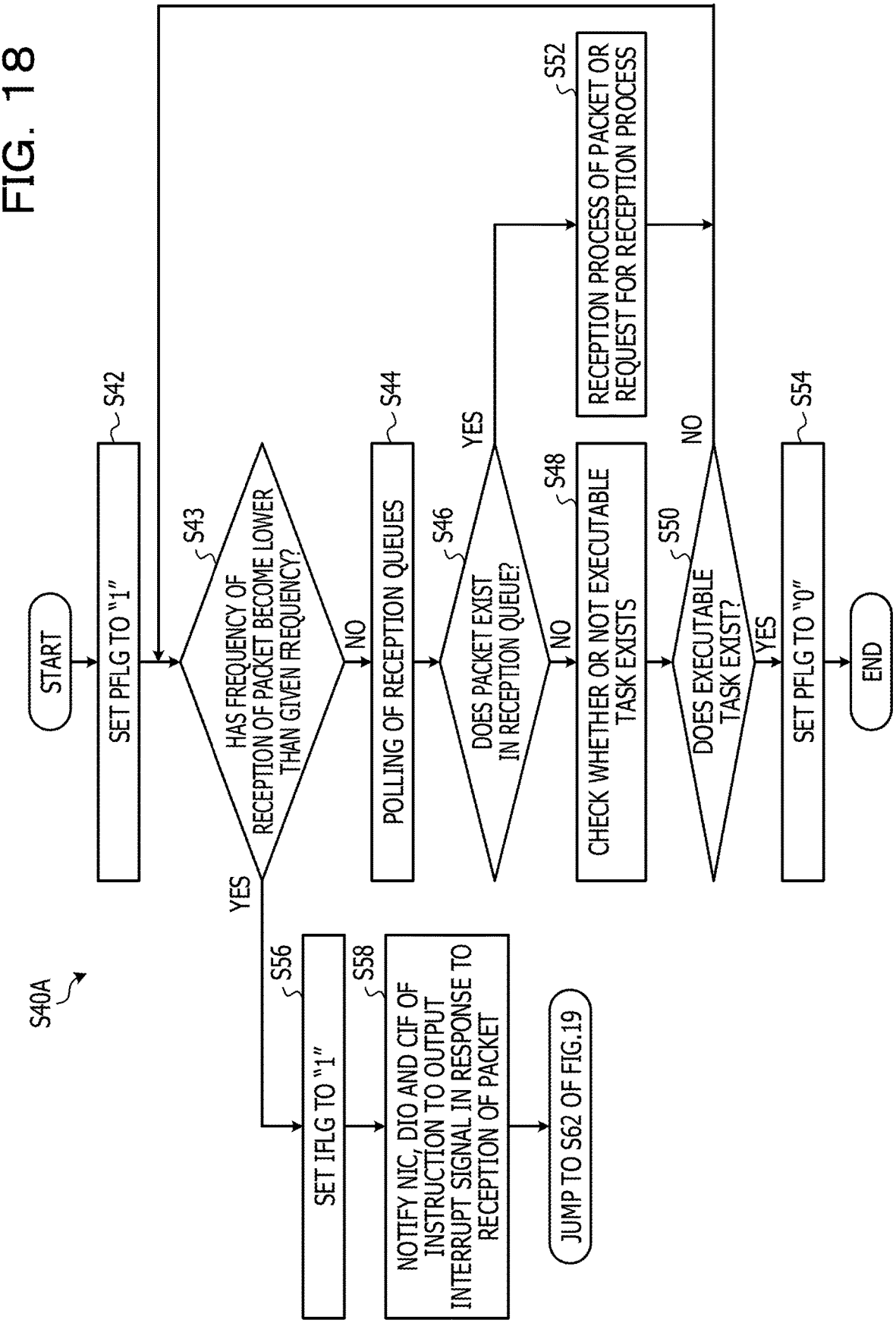
FIG. 18 is a view depicting an example of a process at step S40A depicted in FIG. 17.
Figure 19:
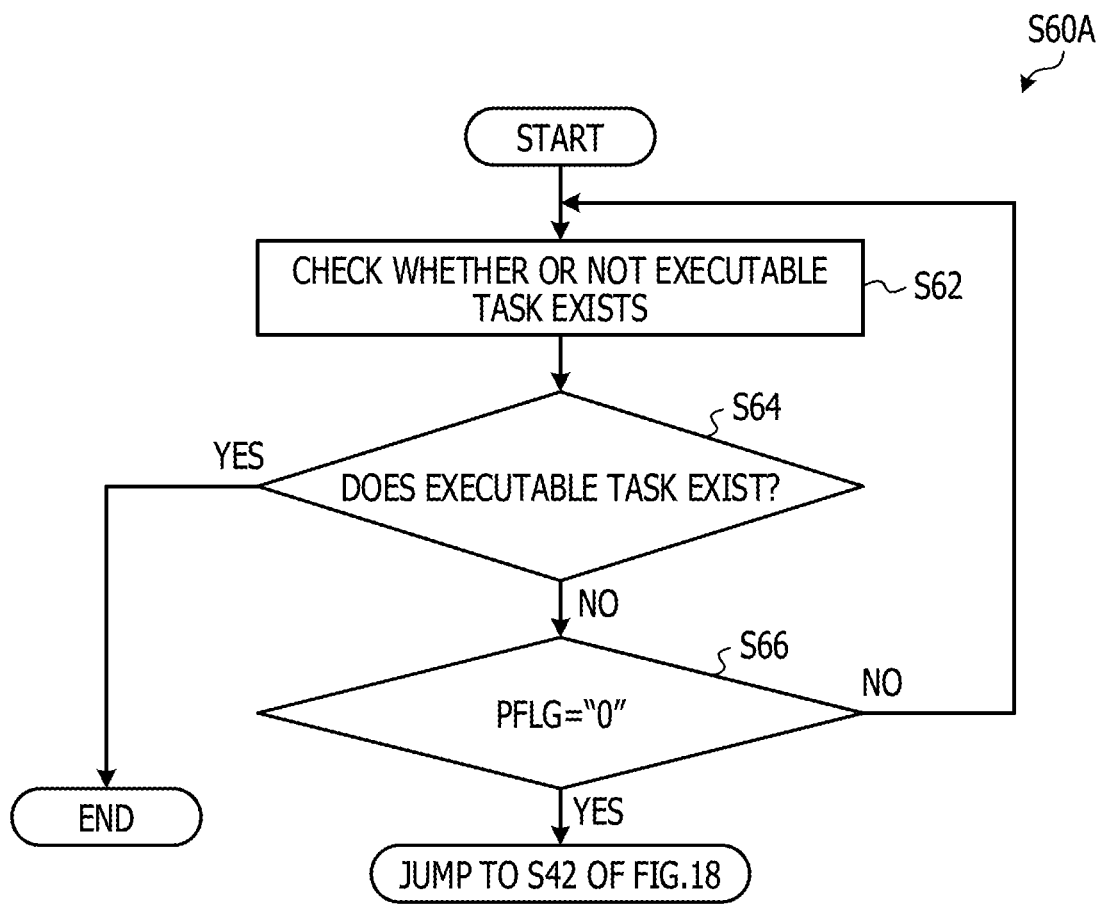
FIG. 19 is a view depicting an example of a process at step S60A depicted in FIG. 17.

An example of step S40A is depicted in FIG. 18 and an example of step S60A is depicted in FIG. 19. After step S40A or S60A, the processing is advanced to step S12. The processes at steps S30, S32, S40A and S60A are executed by the idle routine 70 depicted in FIG. 5. It is to be noted that, in the case where the interrupt flag IFLG is "1," the processes at steps S20, S22, S24, S26 and S28 may be executed before step S30 similarly as in FIG. 15.

For example, similarly as in FIG. 2, the operation frequency of each CPU core 12 in the standby mode in which the idle routine is executed is set low in comparison with the operation frequency of each CPU core 12 in the normal mode in which the kernel main body portion is executed. Consequently, the power consumption of the node 100D may be reduced in comparison with that in an alternative case in which polling of the reception queue RQUE is executed in the normal mode.

FIG. 18 depicts an example of the process at step S40A depicted in FIG. 17. Processes same as those in FIG. 10 are denoted by the same reference symbols, and detailed description of them is omitted herein. First at step S42, the idle routine sets the polling flag PFLG to "1." Then at step S43, the idle routine decides whether or not the frequency of reception of a packet by the reception queues RQUE0, RQUE1 and RQUE2 has become lower than a given frequency set in advance. In the case where the frequency of reception of a packet has become lower than the given frequency, the processing advances to step S56, but in the case where the frequency of acceptance of a packet is equal to or higher than the given frequency, the processing advances to step S44. For example, in the case where the idle routine executes the loop of steps S43, S44, S46, S48 and S50 by a given number of times without detecting a packet retained in the reception queues RQUE, the idle routine decides that the frequency of reception of a packet has become lower than the given frequency. For example, in the case where the period of time within which the reception queues RQUE0, RQUE1 and RQUE2 do not receive a packet exceeds the given period of time, the idle routine decides that the frequency of reception of a packet has become lower than the given frequency.

The processes at steps S44, S46, S48, S50, S52 and S54 are same as the processes at steps S44, S46, S48, S50, S52 and S54 depicted in FIG. 10, respectively. However, in the case where an executable task T does not exist in the task queue 22 at step S50, the idle routine advances the processing to step S43.

On the other hand, at step S56, the idle routine sets the interrupt flag IFLG to "1." Then at step S58, the idle routine notifies the network interface NIC, disk interface DIO and communication interface CIF of an instruction to output an interrupt signal INT (INT0 to INT2) in response to reception of a packet. The network interface NIC, disk interface DIO and communication interface CIF change the operation mode from the non-interrupt operation mode to the interrupt operation mode in accordance with the instruction from the idle routine. The non-interrupt operation mode is an operation mode in which an interrupt signal INT is not outputted, and the interrupt operation mode is an operation mode in which an interrupt signal INT is outputted.

Then, after step S58, the idle routine jumps to step S62 depicted in FIG. 19 to stop polling of the reception queue RQUE. For example, in the case where the frequency of reception of a packet has become lower than the given frequency, the kernel stops the decision by polling of the reception queue RQUE. Then, the kernel detects that a packet is stored in the reception queue RQUE based on the interrupt signal INT0 to INT2 and executes a reception process of the packet.

FIG. 19 depicts an example of the process at step S60A depicted in FIG. 17. Processes same as those in FIG. 13 are denoted by the same reference symbols, and detailed description of them is omitted herein. Processes at steps S62 and S64 are same as the processes at steps S62 and S64 depicted in FIG. 13, respectively. A process at step S66 is similar to the process at step S66 depicted in FIG. 13 except that, in the case where the polling flag PFLG is "0," the processing jumps to step S42 of FIG. 18.

In the case where the frequency of reception of a packet has become lower than the given frequency, by stopping polling of the reception queue RQUE and executing only a check of whether or not an executable task T exists, the CPU core 12 may be suppressed from executing a command for polling. This makes it possible to reduce the power that is consumed by the CPU 10D in comparison with that in an alternative case in which polling of the reception queue RQUE is continued.

It is to be noted that, in the case where the frequency of reception of a packet becomes equal to or higher than the given frequency, the idle routine may set the interrupt flag IFLG to "0." In this case, the network interface NIC, disk interface DIO and communication interface CIF switch the operation mode thereof from the interrupt operation mode to the non-interrupt operation mode in accordance with an instruction from the idle routine. Consequently, issuance of the interrupt signals INT0 to INT2 is suppressed. Then, the reception queue RQUE is polled by the idle routine executed by one of the CPU cores 12.

It is to be noted that, in the case where the CPU 10D depicted in FIG. 16 includes one CPU core 12a, or in the case where all of the CPU cores 12a to 12d poll the reception queue RQUE in an overlapping relationship with each other similarly as in the case of FIG. 4, the CPU 10D may not have the polling flag PFLG.

Figure 20:
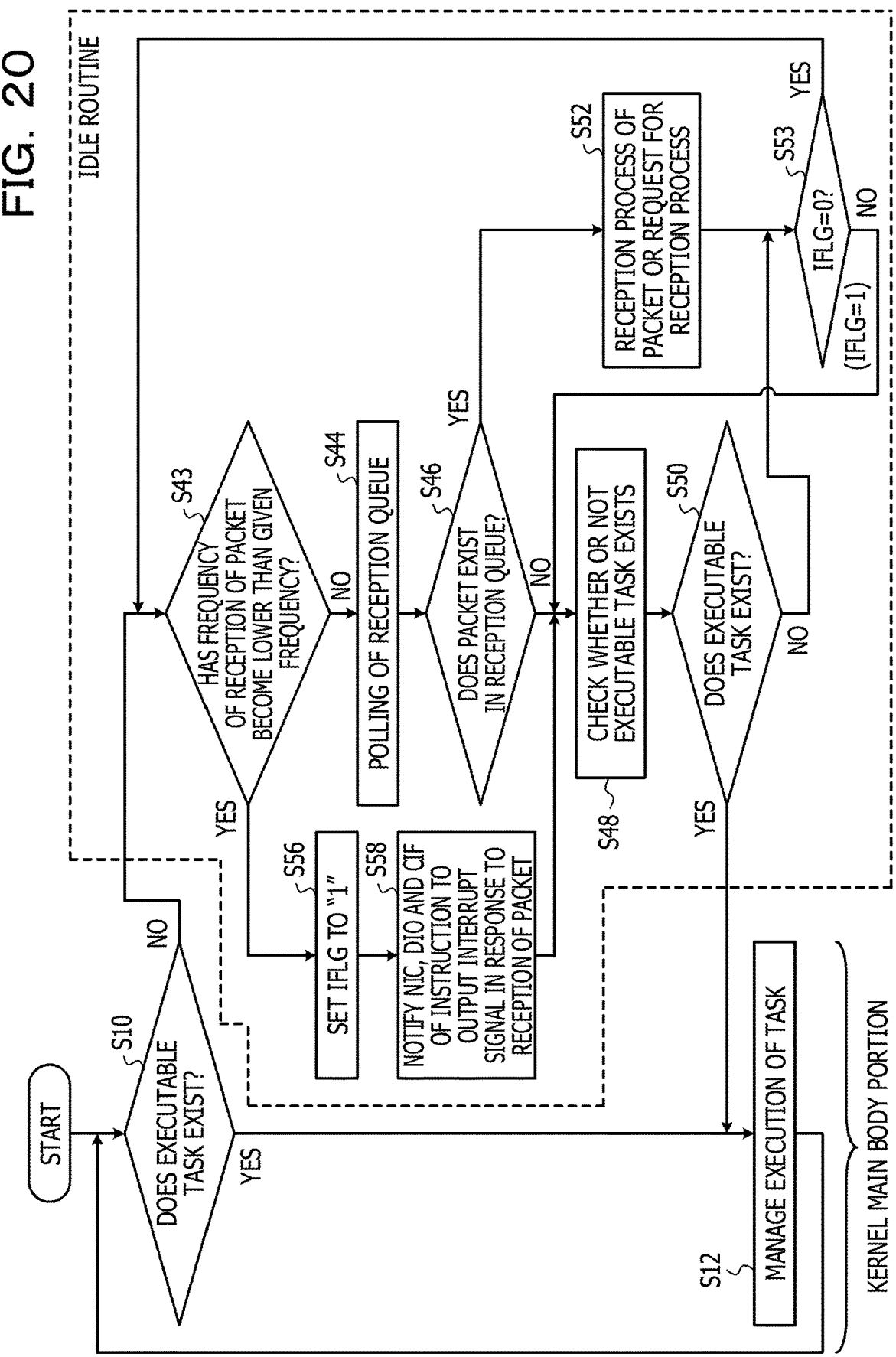
FIG. 20 is a view depicting an example of operation of a kernel executed by a CPU core of a CPU that does not have a polling flag.

FIG. 20 depicts an example of operation of a kernel executed by a CPU core of a CPU that does not have a polling flag. The CPU core, the CPU, and the polling flag described with reference to FIG. 20 may be the CPU core 12, the CPU 10D, and the polling flag PFLG depicted in FIG. 16. Processes same as those in FIGS. 17 and 18 are denoted by the same reference symbols, and detailed description of them is omitted herein. Processes at steps S10 and S12 are same as the processes at steps S10 and S12 depicted in FIG. 17, respectively and are executed by the kernel main body portion 60 depicted in FIG. 5. In the case where an executable task T does not exist in the reception queues RQUE at step S10, the kernel advances its processing to step S43 of the idle routine.

Processes at steps S43, S44, S46, S48, S50, S52, S56 and S58 are same as the processes at steps S43, S44, S46, S48, S50, S52, S56 and S58 depicted in FIG. 18, respectively. However, at step S50, in the case where an executable task T exists in the task queue 6, the idle routine advances the processing to step S12, but in the case where an executable task T does not exist in the task queue 6, the idle routine advances the processing to step S53. Further, the idle routine advances the processing to step S53 after step S52 and advances the processing to step S48 after step S58.

In the case where the interrupt flag IFLG is "0" at step S53, the idle routine advances the processing to step S43 in order to poll the reception queue RQUE. On the other hand, in the case where the interrupt flag IFLG is "1," since polling of the reception queue RQUE is not performed, the idle routine advances the processing to step S48. By the operation depicted in FIG. 20, after the frequency of reception of a packet becomes lower than the given frequency and the interrupt flag IFLG is set to "1," the idle routine stops the polling of the reception queue RQUE and executes only a check of whether or not an executable task T exists.

Also in the embodiment depicted in FIGS. 16 to 20, similarly as in the embodiments depicted in FIGS. 1 to 15, stagnation of execution of the task T may be suppressed also in the case where reception of a packet from the different node 112, HDD or FPGA is decided by polling. By executing polling of the reception queue RQUE in the standby mode, the power consumption of the node 100D may be reduced in comparison with that in the case of execution in the normal mode.

Further, in the embodiment depicted in FIGS. 16 to 20, in the case where the frequency of reception of a packet becomes lower than the given frequency, by stopping the polling of the reception queue RQUE, the CPU core 12 may be suppressed from executing a command for polling. Consequently, the power consumption of the CPU 10D may be reduced in comparison with that in an alternative case in which polling of the reception queue RQUE is continued.

In regard to the embodiments depicted in FIGS. 1 to 20, the following appendices are disclosed further.

The characteristics and the advantages of the embodiments will become apparent from the foregoing detailed description. This is intended that the claims cover such characteristic points and advantages of the embodiments as described above without departing from the spirit and scope thereof. Further, those having ordinary knowledge in the technical field would easily conceive any improvement and alteration. Accordingly, there is no intention to restrict the scope of the embodiments having inventiveness to that described hereinabove, and also it is possible to be based on suitable improvements and equivalencies included in the scope disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
an arithmetic processing unit configured to execute a task retained in a queue; and
a communication controller configured to control communication with another apparatus different than the information processing apparatus,
the arithmetic processing unit including:
a management unit including a first processor configured to manage, when an executable task is included in the queue, execution of the task, and
a standby unit including a second processor configured to execute, when the executable task is not included in the queue, a decision process for deciding, by polling of a reception queue in the communication controller, whether a packet received from the another apparatus is included within the reception queue, repetitively until the executable task is included in the queue.

2. The information processing apparatus according to claim 1,
wherein the information processing apparatus comprises a plurality of arithmetic processing units,
the standby unit of a first arithmetic processing unit that is one of arithmetic processing units in which an executable task is not included in the queue from among the plurality of arithmetic processing units executes the decision process, and
the standby unit of a second arithmetic processing unit that is a different one of the arithmetic processing units in which an executable task is not included in the queue from among the plurality of arithmetic processing units suppresses execution of the decision process.

3. The information processing apparatus according to claim 2, further comprising:
a plurality of retention units individually corresponding to the plurality of arithmetic processing units and configured to retain information received by the communication controller,
wherein the first arithmetic processing unit executes the decision process for each of the plurality of retention units.

4. The information processing apparatus according to claim 3,
wherein the standby unit of the first arithmetic processing unit makes a frequency of the decision process to be executed for the retention unit corresponding to the first arithmetic processing unit greater than a frequency of the decision process to be executed for the retention unit corresponding to each of the arithmetic processing units except the first arithmetic processing unit from among the plurality of arithmetic processing units.

5. The information processing apparatus according to claim 2,
wherein the standby unit of the second arithmetic processing unit suppresses execution of the decision process after the decision process is executed by a given number of times.

6. The information processing apparatus according to claim 1,
wherein, when a frequency of reception of information by the communication controller becomes less than a given frequency, the standby unit issues an instruction to output an interrupt signal in response to reception of information to the communication controller and then stops the decision process, and
the arithmetic processing unit executes a process based on the information received by the communication controller in response to the reception of the interrupt signal.

7. The information processing apparatus according to claim 1,
wherein the information processing apparatus comprises a plurality of arithmetic processing units, and
each of arithmetic processing units in which an executable task is not included in the queue from among the plurality of arithmetic processing units executes the decision process.

8. The information processing apparatus according to claim 1,
wherein the management unit and the standby unit operate exclusively relative to each other, and
an operation frequency of the arithmetic processing unit while the standby unit is in operation is set less than an operation frequency of the arithmetic processing unit while the management unit is in operation.

9. The information processing apparatus according to claim 1, wherein the functions of the management unit and the standby unit are implemented by execution of a kernel, which manages execution of a task, by the arithmetic processing unit.

10. The information processing apparatus according to claim 9,
wherein the function of the standby unit is implemented by an idle routine executed by the kernel when an executable task is not included in the queue.

11. A method performed by an apparatus, the method comprising:
causing a management unit included in an arithmetic processing unit to manage, where an executable task is included in a queue, execution of the task; and
causing a standby unit included in the arithmetic processing unit to execute, when the executable task is not included in the queue, a decision process for deciding, by polling of a reception queue in a communication controller, whether a packet received from the another apparatus is included within the reception queue, repetitively until the executable task is included in the queue.

12. A non-transitory, computer-readable recording medium having stored therein a program for causing a computer included in an information processing apparatus to execute a process, the process comprising:
causing a management unit included in an arithmetic processing unit to manage, when an executable task is included in a queue, execution of the task; and
causing a standby unit included in the arithmetic processing unit to execute, when the executable task is not included in the queue, a decision process for deciding, by polling of a reception queue a communication controller, whether a packet received from the another apparatus is included within the reception queue, repetitively until the executable task is included in the queue.

13. A method performed by an information processing apparatus, the method comprising:
determining, by an arithmetic processing unit, whether a task is included in a queue;
when the task is included in the queue, managing, by a management unit including a first processor, the execution of the task by the arithmetic processing unit in a normal mode;
when the task is not included in the queue, executing a polling, by a standby unit including a second processor, of a reception queue of a communication controlling unit that controls communication with another apparatus different than the information processing apparatus, repetitively, to determine whether a packet has been received in the reception queue in a standby mode; and
when the task is included in the queue, switching to the normal mode from the standby mode to execute the tasked included in the queue.

* * * * *